(12) United States Patent
Banks et al.

(10) Patent No.: US 9,226,220 B2
(45) Date of Patent: Dec. 29, 2015

(54) SYSTEMS AND METHODS FOR PERFORMING TOPOLOGY DISCOVERY IN WIRELESS NETWORKS

(75) Inventors: Kevin Banks, Huntsville, AL (US); David Ewing, Madison, AL (US); Mark Guagenti, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 56 days.

(21) Appl. No.: 12/940,738

(22) Filed: Nov. 5, 2010

(65) Prior Publication Data

US 2011/0134797 A1 Jun. 9, 2011

Related U.S. Application Data

(60) Provisional application No. 61/258,338, filed on Nov. 5, 2009.

(51) Int. Cl.
| | |
|---|---|
| H04W 40/24 | (2009.01) |
| H04L 12/717 | (2013.01) |
| H04W 40/02 | (2009.01) |
| H04W 40/10 | (2009.01) |
| H04W 40/12 | (2009.01) |
| H04W 84/18 | (2009.01) |

(52) U.S. Cl.
CPC ............ *H04W 40/246* (2013.01); *H04L 45/42* (2013.01); *H04W 40/023* (2013.01); *H04W 40/10* (2013.01); *H04W 40/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,342,896 B2 * | 3/2008 | Ayyagari ................ | 370/254 |
| 7,401,152 B2 * | 7/2008 | Traversat et al. ......... | 709/230 |
| 7,403,492 B2 | 7/2008 | Zeng et al. | |
| 7,443,833 B2 * | 10/2008 | Ayyagari ................ | 370/351 |
| 7,720,471 B2 * | 5/2010 | Ayyagari et al. ......... | 455/426.1 |
| 2002/0044533 A1 | 4/2002 | Bahl et al. | |
| 2003/0177263 A1 | 9/2003 | Robinson | |
| 2004/0218548 A1 | 11/2004 | Kennedy et al. | |
| 2005/0174950 A1 * | 8/2005 | Ayyagari ................ | 370/254 |
| 2006/0029007 A1 * | 2/2006 | Ayyagari ................ | 370/310 |
| 2008/0219237 A1 * | 9/2008 | Thubert et al. ............ | 370/349 |
| 2008/0291847 A1 | 11/2008 | Zheng | |
| 2010/0074146 A1 | 3/2010 | Banks | |
| 2010/0177665 A1 * | 7/2010 | Ayyagari et al. ......... | 370/254 |

* cited by examiner

*Primary Examiner* — Gregory Sefcheck
(74) *Attorney, Agent, or Firm* — Maynard Cooper & Gale, P.C.; Jon E. Holland

(57) ABSTRACT

A wireless mesh network has a plurality of nodes. One of the nodes, referred to as a "topology building node," is configured to discover a topology of the network. In this regard, a multicast topology message is transmitted via at least one node of the network. Each node that receive such message transmits a topology multicast reply to the topology building node which adds the transmitting node to the topology if the transmitting node is not already identified by the topology. Upon adding a node to the topology, the topology building node transmits a topology multicast command to the added node thereby causing such node to transmit a multicast topology message. Accordingly, the topology eventually receives a topology multicast reply from each node of the network allowing such node to build a complete topology of the network.

14 Claims, 11 Drawing Sheets

| Destination Address | Hop Address |
|---|---|
| Dest. Address 1 | Hop Address 1 |
| Dest. Address 2 | Hop Address 2 |
| Dest. Address 3 | Hop Address 3 |
| Dest. Address 4 | Hop Address 4 |
| Dest. Address 5 | Hop Address 5 |
| Dest. Address 6 | Hop Address 6 |
| Dest. Address 7 | Hop Address 7 |
| Dest. Address 8 | Hop Address 8 |
| Dest. Address 9 | Hop Address 9 |
| Dest. Address 10 | Hop Address 10 |

FIG. 9

SYSTEMS AND METHODS FOR PERFORMING TOPOLOGY DISCOVERY IN WIRELESS NETWORKS

CROSS REFERENCE TO RELATED APPLICATION

This application claims priority to U.S. Provisional Patent Application No. 61/258,338, entitled "Wireless Communication Systems and Methods," and filed on Nov. 5, 2009, which is incorporated herein by reference.

RELATED ART

The proliferation of applications using wireless communication is increasing as more and more users seek solutions that provide increased mobility and flexibility. However, wireless communication has numerous challenges and problems. For example, since wireless signals are transmitted through free space, data collisions with other wireless signals from foreign networks can occur. Further, the effects of various noise sources and even weather can have a more pronounced effect on wireless communication as compared to communication occurring over physical media. Moreover, wireless communication in particularly noisy environments, such as manufacturing plants, can be quite problematic.

Further, in implementing a wireless network, such as a Wireless Sensor Network (WSN), various protocols need to be established and techniques for overcoming some of the aforementioned challenges for wireless communication are necessary. In addition, the functionality and interaction of the nodes of the network can be relatively complex, particularly for wireless networks in which data communication may be unreliable at times due to varying environmental conditions and noise levels. Moreover, engineering a wireless sensor network can be extremely expensive and burdensome.

Techniques for reducing the cost and burden of designing and developing networks, such as wireless sensor networks, are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 7 is a diagram illustrating an exemplary GUI for displaying information about the configuration of a network, such as is depicted in FIG. 3.

FIG. 8 is diagram illustrating an exemplary GUI for displaying source code for nodes of a network, such as is depicted by FIG. 3.

FIG. 9 illustrates and exemplary routing table for a node, such as is depicted in FIG. 5.

DETAILED DESCRIPTION

The present disclosure generally pertains to systems and methods for use in wireless networks, such as wireless sensor networks (WSN).

Figure 1:
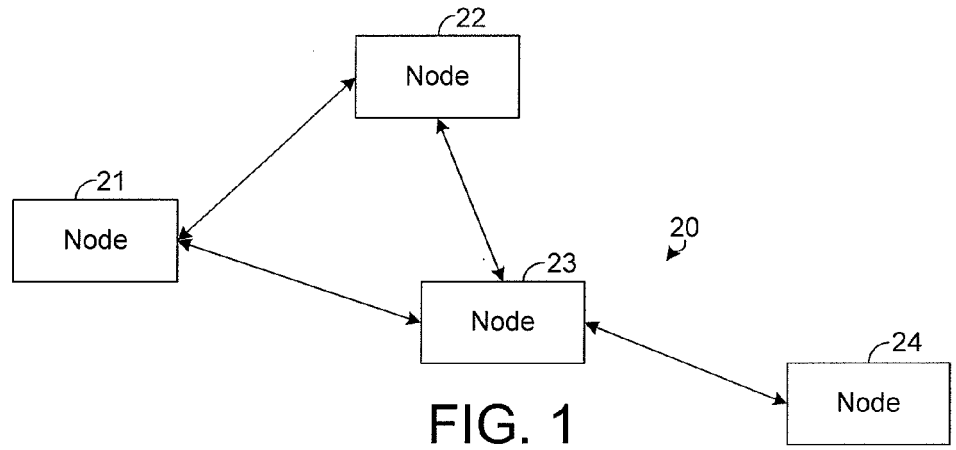
FIG. 1 is a block diagram illustrating an exemplary wireless network in accordance with the present disclosure.

FIG. 1 depicts a wireless sensor network 20 of an exemplary embodiment of the present disclosure. The network 20 has a plurality of nodes 21-24. FIG. 1 depicts four nodes 21-24 for simplicity, but the network 20 may have any number of nodes 21-24 in other embodiments. In one exemplary embodiment, the network 20 is implemented as a mesh network, but other types of networks may be implemented in other embodiments. Exemplary networks are described in U.S. patent application Ser. No. 12/114,566, entitled "Systems and Methods for Dynamically Configuring Node Behavior in a Sensor Network, and filed on May 2, 2008, which is incorporated herein by reference, and in U.S. Provisional Patent Application No. 60/974,836, entitled "Wireless Communication Networks," and filed on Sep. 24, 2007, which is incorporated herein by reference. Exemplary networks are further described in U.S. patent application Ser. No. 12/237,158, entitled "Systems and Methods for Adaptively Adjusting Codec Rates for Communication Networks," and filed on Sep. 24, 2008, which is incorporated herein by reference, and in U.S. patent application Ser. No. 12/237,192, entitled "Systems and Methods for Reducing Data Collisions in Wireless Network Communications," and filed on Sep. 24, 2008, which is incorporated herein by reference. Exemplary wireless networks are also described in U.S. patent application Ser. No. 12/463,073, entitled "Systems and Methods for Wirelessly Communicating Multidrop Packets via Wireless Networks," and filed on May 8, 2009, which is incorporated herein by reference.

Each node 21-24 is able to communicate with any of the other nodes 21-24. In one exemplary embodiment, the nodes 21-24 communicate among one another wirelessly, but it is possible for any of the nodes 21-24 to communicate with any of the other nodes 21-24 over a conductive medium. Messages may hop from node-to-node in order to reach a destination. For example, in the exemplary embodiment shown by FIG. 1, the nodes 21-23 are within range of each other such that any of the nodes 21-23 can communicate directly with any of the other nodes 21-23. However, the node 24 is only within range of node 23. The other nodes 21 and 22 can use node 23 to route a message to node 24. In this regard, each node 21-24 has a routing table that indicates routes for messages. As known in the art, routing tables can be created and updated via a variety of techniques. In general, nodes communicate among one another to learn of data paths for various destinations. Once a path to a particular destination is discovered, the routing table or tables of the nodes along the path may be updated and later used to route a message to the destination.

Moreover, to enable the node 21 of network 20 to send a message to node 24, the node 21 may have a routing table indicating that such a message is to hop through the node 23. Thus, the node 21 inserts the address, referred to as the "hop address," of the next hop or, in other words, the next node to receive the message (i.e., node 23 in this example), as well as the address, referred to as the "destination address," of the node (i.e., node 24 in this example) to ultimately receive and process the message. Based on the hop address, the routing node 23 receives the message and consults its routing table to determine where to route the message. In the instant example, the routing table indicates that a message destined for the node 24 can be transmitted directly to the node 24. Thus, the routing node 23 retransmits the message using the address of the node 24 as both the destination address and the hop address for the message. The node 24 receives the message and processes it as appropriate. Thus, even though node 21 cannot communicate directly with the node 24, the node 21 can have the message routed through the network 20 to the node 24. The concept of routing messages through a mesh network using routing tables is generally well-known.

In general, there are at least two types of messages communicated by the network 20, unicast messages and multicast messages. A "unicast" message refers to a message that is destined for a specific node, referred to as the "destination" or "destination node." Such a message includes a destination address identifying the destination node. In general, a node in the network 20 does not respond to a unicast message unless the node is identified by either the destination address or a hop address in the message. Thus, if a node is not the destination node for a unicast message or within the data path for routing the message to its destination, the node does not respond to the unicast message but rather discards it upon reception.

In one exemplary embodiment, reliability of data communication is enhanced through the use of acknowledgements. That is, when a node ("receiving node") receives a unicast message transmitted from another node ("transmitting node"), the receiving node replies with an acknowledgment to the transmitting node. Thus, upon receipt of the acknowledgement, the transmitting node is aware that the unicast message has been received by the receiving node. If the transmitting node does not receive an acknowledgment within a predefined time period after transmission, then the transmitting node assumes that the unicast message failed to reach the receiving node and retransmits the unicast message. Note that each message includes the address of the transmitting node. In addition, an acknowledgement is sent for each respective hop along a data path. Thus, each node along the data path is able to ensure that the next hop has received the unicast message.

A "multicast" message, on the other hand, is a message destined for multiple nodes. In many cases, it is intended for a multicast message to be received and processed by every node in the network 24. Multicast messages are not communicated along predefined data paths indicated by the routing tables of the network nodes, and acknowledgments are not returned for multicast messages. Instead, except as otherwise described herein, a multicast message is generally rebroadcast by nodes that receive it regardless of whether such nodes are identified by the message.

In one exemplary embodiment, each multicast message includes a value, referred to as a "time-to-live value," indicating the number of times that the message is to be retransmitted. Each node that receives a multicast message is configured to retransmit the message as long as the time-to-live value is above a threshold, such as zero. However, before retransmitting the multicast message, the node decrements the time-to-live value. Thus, eventually, a node receives the multicast message after the time-to-live value has been decremented below the threshold and, therefore, does not retransmit the message. Accordingly, depending on the time-to-live value, a multicast message is rebroadcast through the network 20 for a limited time. Note that the same multicast message may be received by multiple nodes and retransmitted by each such node. Thus, after transmission of a multicast message, the message is repeatedly transmitted by other nodes through the network 20 for a finite period of time. In one exemplary embodiment, acknowledgments are not communicated for multicast messages, although the communication of acknowledgments is possible, if desired. Instead, it is assumed that each node of the network 20 has received the multicast message.

As an example, assume that a significant number of data collisions occur as the nodes are attempting communication on a particular channel. One of the nodes, sensing a high number of data collisions, may determine that communication is to be switched to a new channel. In such an example, the node may transmit a multicast message instructing the other nodes to switch to the new channel. Each node that receives the multicast message retransmits the message and begins communicating over the new channel as instructed. Eventually, the multicast message is received by each node of the network 20, and each such node, therefore, begins to communicate over the new channel. In other examples, other types of multicast messages may be communicated.

Figure 2:
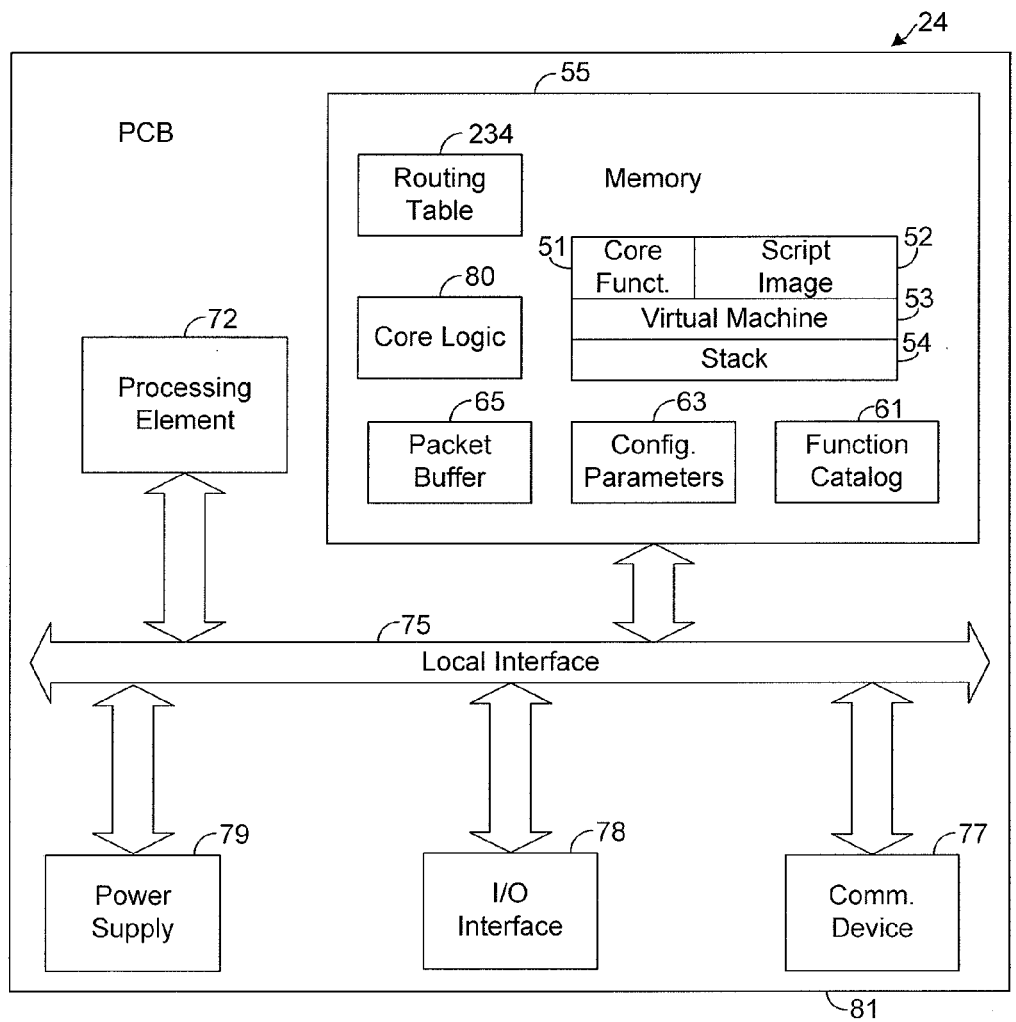
FIG. 2 is a block diagram illustrating an exemplary network node, such as is depicted in FIG. 1.

FIG. 2 depicts an exemplary embodiment of one of the nodes 24. Note that any of the other nodes 21-23 may be configured similarly to or identical to the node 24 depicted by FIG. 2. In the exemplary embodiment shown by FIG. 2, various software, including core functions 51, a script image 52, a virtual machine 53, and a network stack 54, are stored in memory 55. In other embodiments, portions of the components 51-54 may be implemented in firmware, hardware, or a combination of software, firmware, and/or hardware. Further, various data, such as a function catalog 61 and configuration parameters 63 are also stored in memory 55, and a portion of the memory 55 is used as a packet buffer 65 to buffer packets that have been communicated through the network 20 and received by the node 24.

Note that the core functions 51, the script image 52, the virtual machine 53, and the network stack 54, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The exemplary embodiment of the network node 24 depicted by FIG. 2 includes a processing element 72, which comprises processing hardware for executing instructions stored in memory 55. The processing element 72 communicates to and drives the other elements within the node 24 via a local interface 75, which can include at least one bus. Furthermore, a communication device 77 communicates with other nodes of the network 20. In one exemplary embodiment, the communication device 77 comprises an RF radio or other wireless communication device for communicating wireless signals with other nodes of the network 20.

The node 24 also has an input/output (I/O) interface 78 for enabling the node 24 to exchange data with other devices. For example, the I/O interface 78 may be coupled to a sensor (not shown) and receive data from the sensor. The I/O interface 78 may also be coupled to an apparatus (not shown), such as a motor or actuator, for performing an action under the direction and control of the script image 52 or other logic.

The node 24 is coupled to a power supply 79, which provides electrical power to the components of the node 24. In one exemplary embodiment, the power supply 79 comprises a battery. However, the power supply 79 may have an interface that allows the power supply 79 to plug into or otherwise interface with an external component, such as a wall outlet, and receive electrical power from such external component.

In one exemplary embodiment, each component shown by FIG. 2 resides on and is integrated with a printed circuit board (PCB) 81. However, in other embodiments, other arrangements of the node 24 are possible.

The stack 54 is configured to drive the communication device 77 and to handle network communication for the node 24. In this regard, when payload data is to be transmitted through the network 20, the network stack 54 is configured to packetize the payload data into at least one data packet and to wirelessly transmit the data packet from the node 24 via the communication device 77. When a data packet is received by the communication device 77, the packet is buffered in the packet buffer 65, and the stack 54 depacketizes the packet in order to recover the payload data. The network stack 54 is also configured to retransmit multicast messages and to ensure the reliable communication of unicast messages. In this regard, the stack 54 is configured to transmit acknowledgements, as appropriate, for received messages, and to ensure that acknowledgements are received for transmitted messages. If an acknowledgment is not received for a transmitted message in a timely manner, the network stack 54 is configured to initiate a retransmission of the message. Moreover, the operation of the stack 54 is transparent to the script image 52. For example, once the script image 52, which is running on the virtual machine 53, provides data to be transmitted to another node, the script image 52 can proceed with another task without handling or monitoring any part of the communication operations that are performed in order to reliably communicate the data to its destination. Moreover, the programmer of the script image 52 does not need to program the script image 52 to handle or monitor such communication operations.

In one exemplary embodiment, the virtual machine 53 is implemented as a bytecode interpreter. In this regard, the script image 52 comprise bytecode capable of being executed by the virtual machine 53. In one embodiment, the core functions 51 are written in the C computer language, and the script image 52 is written in the Python computer language. However, other languages are possible in other embodiments.

Further, in one exemplary embodiment, the script image 52 is written by a user and uploaded to the node 24 over the network 20, as will be described in more detail hereafter. Each script image 52 includes at least one function having a function name that enables the function to be called by a function call, also referred to herein as a "procedure call." The script image 52 is user-defined and can be written to perform any desired functionality, such as monitoring or controlling devices external to the node 24, depending on the node's intended application.

The node 24 also has a plurality of predefined functions 51, referred to as the "core functions." Each core function 51 is associated with a function name that enables the function to be called by a function call. The core functions 51 enable a basic set of functionality that is likely to be useful regardless of the intended application of the node 24. For example, one of the core functions 51 may enable data to be written to or read from the memory 55. In another example, a core function 51 is used to store the script image 52 into memory 55. In another example, a core function 51 is used to set one or more of the configuration parameters 63. The configuration parameters 63 are settings that control various aspects of the node's operation. Such configuration parameters 63 may be checked by the stack 54 or other node resources at run time to control various operations. Various other types of functionality may be performed by the core functions 51.

The name of each function, inclusive of the core functions 51 and the functions defined by the script image 52, is listed in a function catalog 61. The function catalog 61 comprises a listing of function names, and for each function name, the catalog 61 comprises a pointer that points to the address where the function is stored. Thus, when the virtual machine 53 executes a function call, the virtual machine 53 searches the function catalog 61 to find the matching function name. Once the matching name is found in the catalog 61, the associated pointer is used by the virtual machine 53 to locate and invoke the called function.

In one exemplary embodiment, the function catalog 61 is pre-sorted into some logical order so that it is unnecessary for the virtual machine 53 to check each function name in the catalog 61 before making a determination that a given function name is missing from the catalog 61. For example, in one exemplary embodiment, the function names in the catalog 61 are listed in alphabetical order. Thus, when the virtual machine 53 executes a function call, the virtual machine 53 implements an algorithm that efficiently finds, without checking every name in the catalog 61, the two function names in the catalog 61 that would immediately precede and follow the function name indicated by the function call. If the called function name is not between the located function names in the catalog 61, then the virtual machine 53 determines that the called function is not stored in the memory 55 and proceeds accordingly without checking the names of other functions in the catalog 61. If the called function name is between the located function names in the catalog 61, then the virtual machine 53 retrieves and executes the called function based on the associated pointer in the catalog 61. In other embodiments, the function catalog 61 can be pre-sorted in different ways, and it is unnecessary for the function catalog 61 to be pre-sorted in every embodiment. Pre-sorting the function catalog 61, however, can save processing time in finding a called function.

As shown by FIG. 2, the node 24 comprises core logic 80 for generally controlling the resources of the node 24. In one exemplary embodiment, the core logic 80 is firmware that runs on the processing element 72 independent of the virtual machine 53. However, other configurations of the core logic 80 are possible. For example, the core logic 80 can be implemented in hardware, software, firmware, or any combination thereof. The core logic 80 performs various basic control functions, such as interfacing data from the script image 52 or core functions 51 with hardware resources, such as the communication device 77 and/or I/O interface 78. Various other functionality may be performed by the core logic 80, which will be described in more detail hereafter.

In one exemplary embodiment, a virtual machine 53 is stored in each node of the network 20 so that any given script image 52 may be successfully executed on any node of the network 20, if desired. Exemplary techniques for defining the script images 52 and communicating the script images 52 through the network 20 will be described in more detail hereafter.

Note that running the script image 52 on a virtual machine 53 helps to isolate the script image 52 from the stack 54 such that the programmer of the script image 52 does not need to be concerned with how the stack 54 operates or when resources are consumed by the stack 54. Further, in one exemplary embodiment, various hardware resources allocated to the virtual machine 53 are not allocated to the stack 54 so that operation of the stack 54 can be separated from that of the virtual machine 53. For example, assume that the processing element 72 has multiple timers (not shown). Some of the timers are exclusively allocated to the virtual machine 53 relative to the stack 54 so that the stack 54 may not use these timers, and some of the timers are exclusively allocated to the stack 54 relative to the virtual machine 53 so that the virtual machine 53 may not use these timers. Various other hardware resources may be exclusively allocated to the stack 54 or virtual machine 53 in a similar manner. In utilizing the resources allocated to the virtual machine 53, it is unnecessary for the programmer of a script image 52, which runs on the virtual machine 53, to be concerned with the operation of the stack 54 since the stack 54 cannot consume such resources.

Thus, the programmer may write the script image 52 to perform any desired function without having knowledge of how the stack 54 handles communication with the network 20. Further, one of the core functions 51 may be to interface payload data with the stack 54 such that the stack 54 communicates the payload data through the network 20 to a destination. In such case, the programmer may simply include a function call for such function in the script image 52 being written and assume that the payload data will be successfully communicated upon execution of the function call without writing any code for handling or monitoring such communication. In this regard, the underlying operations for communicating the payload data over the network 20 are transparent to the script image 52 and, therefore, the programmer who is writing the script image 52.

Indeed, in one exemplary embodiment, a manufacturer of the network 20 provides a user (e.g., a purchaser) with all of the nodes 21-24. For each node 21-24, the components of the node reside on a PCB 81 that is small enough to be transported by hand to any desired location. Further, each node is supplied to the user with all of the components shown by FIG. 2 except for the script image 52, which is later written by the user and uploaded to the nodes 21-24 as appropriate depending on the intended application for the network 20. However, the core functions 51, the virtual machine 53, and the stack 54 provide the user with the ability to easily upload the script image 52 into any node without any understanding of how the stack 54 handles wireless communication over the network 20. Further, the configuration parameters 63 are set to certain default values and wireless communication is enabled at power up without the user having to upload any code into any of the node 21-24. Thus, the user may connect any of the nodes 21-24 to any apparatus to be controlled via the network 20 and/or any sensor to be monitored by the network 20. The user may also use the network 20 to wirelessly push the scripts 52 for controlling any such apparatus or monitoring any such sensor to any of the nodes 21-24 as may be desired. In this regard, without having any knowledge of the underlying communication enabled by the stack 54, the user can dynamically configure the behavior of any node 21-24 by generating a script image 52, which can include function calls for any of the core functions 51 or for any function defined by a script image 52 uploaded to a node.

In addition, as will be described in more detail hereafter, it is possible for any node 21-24 to use a remote procedure call to invoke a function stored on any of the other nodes of the network 20. As used herein a "remote" procedure call refers to any procedure call that is communicated from one node to another such that the procedure call is executed on a node that is remote from the one that originally transmitted the procedure call.

Figure 3:
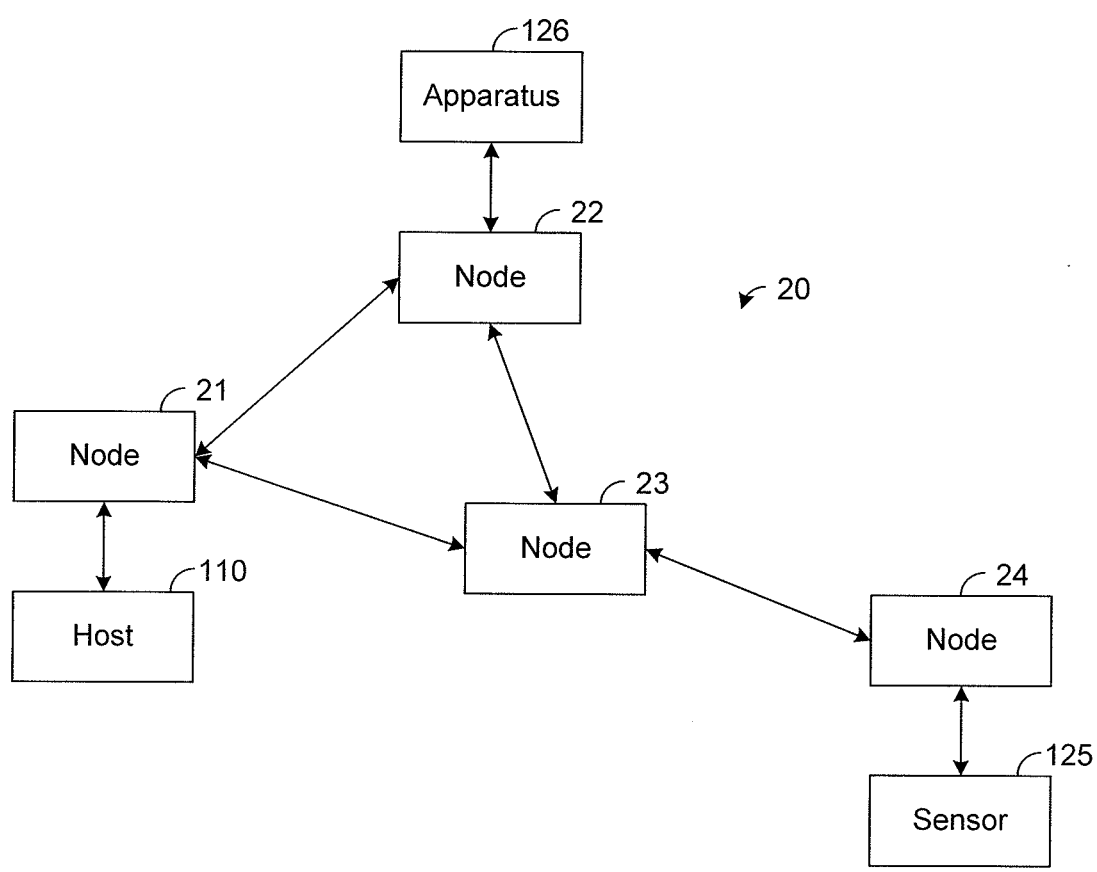
FIG. 3 is a block diagram illustrating an exemplary wireless network in accordance with the present disclosure.

To better illustrate the foregoing, assume that the node 24 is coupled to a sensor 125 and that the node 22 is coupled to an apparatus 126, as shown by FIG. 3. For illustrative purposes, assume that the sensor 125 is a switch that is activated when toggled by a user and that the apparatus 126 is a light source that is to emit light when the sensor 125 is activated. Further assume that the script image 52 stored at the node 24 includes a function, called "Check_Switch," that is configured to monitor the sensor 125 and determine when it is activated. Further assume that one of the core functions 51 of the node 24 named "RPC" is configured to transmit a remote procedure call message through the network 20. Also assume that a script image 52 at the node 22 includes a function called "Light_On" that, when executed, transitions the apparatus 126 into a state such that it emits light.

While running on the virtual machine 53 of node 24, assume that the Check_Switch function detects activation of the sensor 125. In response, the Check_Switch function is configured to call the RPC function 51 and, in the function call, to pass the name of the function to be called (i.e., "Light_On" in the instant example) and the address of the node 22. Thus, the RPC function is called by the virtual machine 53 of the node 24, and the RPC function causes an RPC message including the function name "Light_On" to be transmitted as a unicast message to the node 22.

Upon reception of the RPC message, the virtual machine 53 of the node 22 invokes the Light_On function based on the function name in the remote procedure call. In this regard, the RPC includes as payload data the function name "Light_On" and overhead information that identifies the message as an RPC. Thus, when executing the function call, the virtual machine 53 of node 22 searches the function catalog 61 for the name "Light_On" indicated by the payload data. Upon locating such name, the virtual machine 53 uses the associated pointer in the function catalog 61 to locate and then execute the Light_On function. When executed, the Light_On function changes the state of the apparatus 126 such that it begins emitting light. In a similar manner, a function at any node of the network 20 can be written to call a function stored at any other node. In other examples, other types of functionality could be enabled by the network 20.

As described above, the I/O interface 78 (FIG. 2) of any of the nodes 21-24 may be coupled to any external device. In one exemplary embodiment, at least one node 21-24 is coupled to a host that is used to upload at least one script image 52. For example, FIG. 3 depicts an exemplary embodiment in which the I/O interface 78 of the node 21 is coupled to a host 110. In one exemplary embodiment, the host 110 is a computer, such as a desk-top, lap-top, or hand-held computer, but other types of devices may be used to implement the host 110 in other embodiments. Further, the host 110 may be coupled to the node 21 via a conductive medium to allow data to be exchanged between the host 110 and the node 21. For example, the host 110 and node 21 could communicate over a communication connection via RS-232 protocols or other types of protocols. Alternatively, the host 110 may be configured to communicate with the node 21 via wireless signals.

Figure 4:
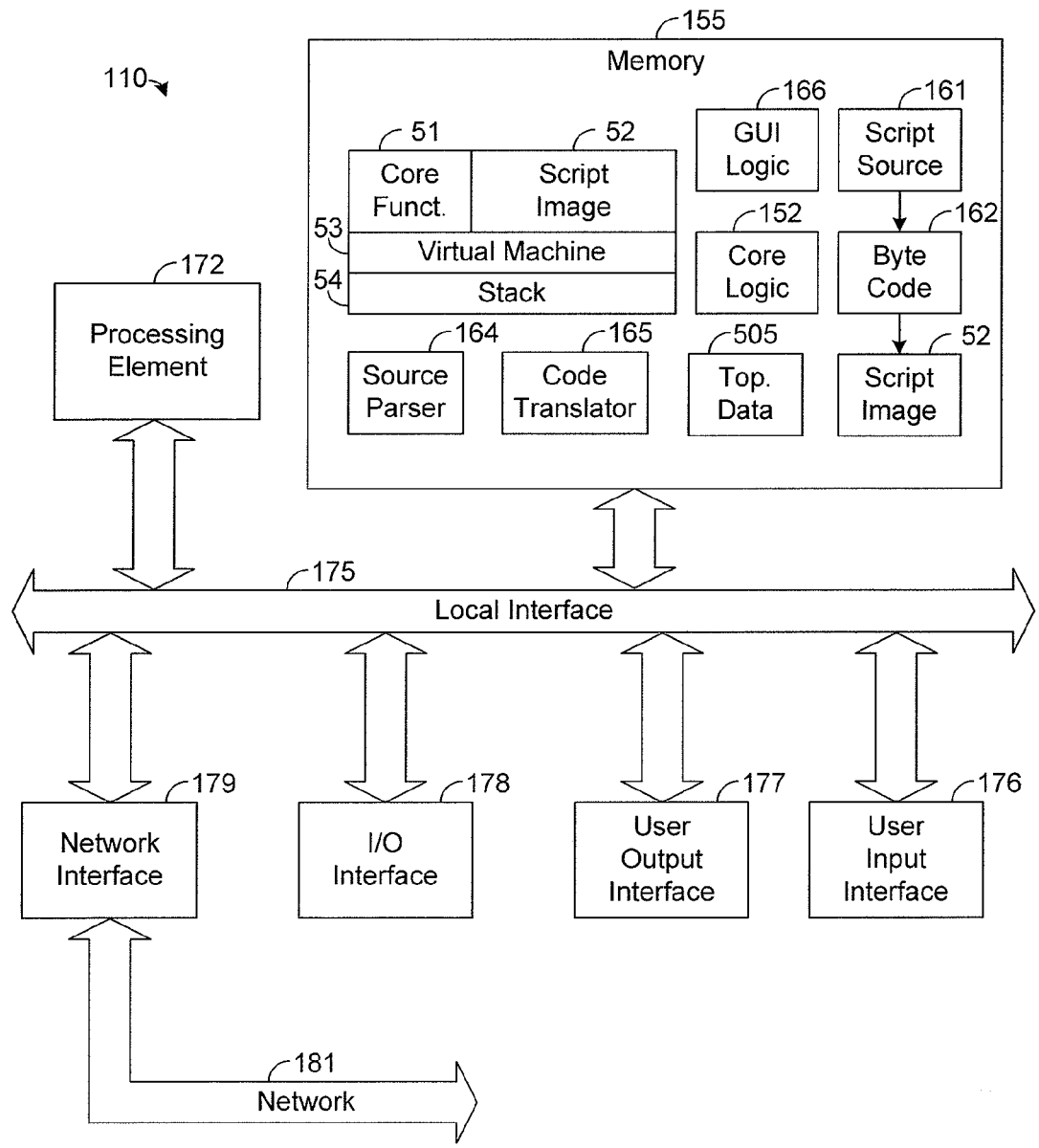
FIG. 4 is a block diagram illustrating an exemplary host, such as is depicted in FIG. 3.

FIG. 4 depicts an exemplary embodiment of the host 110. As shown by FIG. 4, the host 110 comprises host core logic 152 for generally controlling the operation of the host 110, as will be described in more detail below. It should be noted that the core logic 152 can be implemented in software, firmware, hardware, or any combination thereof. In the exemplary embodiment illustrated in FIG. 4, the core logic 152 is implemented in software and stored in memory 155 of host 110.

Various code, such as script source 161, bytecode 162, script image 52, a source parser 164, a code translator 165, and GUI logic 166 are also stored in memory. Note that, in other embodiments, at least portions of the source parser 164, code translator 165, and the GUI logic 166 can be implemented in hardware, firmware, or any combination of hardware, software, and firmware. When implemented in software, the core logic 152, the source parser 164, code translator 165, and the GUI logic 166 can be stored and transported on any computer-readable medium for use by or in connection with an instruction execution apparatus that can fetch and execute instructions.

The exemplary embodiment of the host 110 depicted by FIG. 4 comprises a processing element 172, which comprises processing hardware for executing instructions stored in memory 155. The processing element 172 communicates to and drives the other elements within the host 110 via a local interface 175, which can include at least one bus. Furthermore, a user input interface 176, for example, a keyboard or a mouse, can be used to input data from a user of the host 110, and a user output interface 177, for example, a display device (such as a liquid crystal display) or printer, can be used to output data to the user. Furthermore, an input/output (I/O) interface 178 enables the host 110 to communicate with external devices, such as node 21. For example, the I/O interface 178 may be conductively or otherwise communicatively coupled to the I/O interface 78 of node 21 or other device.

The host 110 also has a network interface 179 for enabling it to exchange data with a network 181, such as a wide area network (WAN) or local area network (LAN). As an example, the network interface 179 may be configured to communicate with the Internet via transmission control protocol/Internet protocol (TCP/IP).

When a user wishes to program a node of the network 20 to perform a desired function, the user writes script source 161 defining a script for execution by the node. In one exemplary embodiment, the script source 161 is source code that is written in Python, but the script source 161 may be written in other languages, if desired. A conventional source parser 164 parses, compiles, and tokenizes the script source 161 to provide bytecode 162 capable of being executed. A code translator 165 translates the bytecode 162 into a script image 52 that can be transmitted to and run on the virtual machine 53 (FIG. 2) of any node of the network 20. In particular, the code translator 165 analyzes the bytecode 162 and performs various optimizations that make running of the script image 52 on an embedded virtual machine 53 more efficient.

As an example, the code translator 165 analyzes the bytecode 162 for global variables, which typically are stored in random access memory (RAM). The code translator 165 attempts to identify any variables in the bytecode 162 that are not changed at run time. For example, assume that the bytecode 162 has an instruction that initializes a value of the variable, but the bytecode 162 does not have an instruction for assigning a new value to the variable. In such a case, the value of the variable is not changed by the bytecode 162 after initialization. If the code translator 165 identifies such a variable, the translator 165 changes the data type from variable to constant in the script image 52. Further, the virtual machine 53 of each node is configured to store constants in a memory other than RAM, such as flash memory. Thus, variables that are re-classified as constants do not consume RAM, thereby helping to reduce the RAM size requirements. Other types of optimizations could be performed by the code translator 165.

The script image 52 provided by the code translator 165 is capable of running on the virtual machines 53, which are Python bytecode interpreters in one exemplary embodiment. The host core logic 152 is configured to transmit the script image 52 to the node 21 along with the node address or addresses of the network node or nodes on which the script image 52 is to be stored and executed. If the node 21 is identified, the script image 52 is stored in memory 55 of the node 21. For example, one of the core functions 51 may be a process for storing a script image 52 in memory 55. As part of this process, the core function 51 updates the function catalog 61 to include an entry for function names of the functions in the script image 52. Thus, any of the script functions can be later invoked via execution of a function call identifying the name of the function. In this regard, when the virtual machine 53 executes a function call having the name of a function within the script image 52, the virtual machine 53 consults the function catalog 61 to locate the script's name within the catalog 61 and the associated pointer. The virtual machine 53 may then use the pointer to invoke the function being called.

If the destination address received along with the script image 52 from the host 110 identifies a node other than the node 21 coupled to the host 110, then the node 21 transmits the script image 52 to the identified node. In this regard, the stack 54 packetizes the script image 52 into at least one data packet, which has a header identifying the destination. For example, if the script image 52 is to be uploaded to node 23, then the destination address of the packet identifies the node 23. In such case, the packet is wirelessly transmitted by the communication device 77 of the node 21 to the node 23, which receives the packet and stores the packet in the packet buffer 65. The stack 54 depacketizes the packet and provides the payload data of the packet, which is at least a portion of the script image 52, to the virtual machine 53 of node 23. The virtual machine 53 of the node 23 stores the script image 52 in memory 55 and updates the function catalog 61 similar to the techniques described above for storing the script image 52 in the node 21. Thus, any function of the script image 52 can be invoked and executed by the virtual machine 53 of the node 23 in response to execution of a function call that includes the function's name.

In one exemplary embodiment, the function catalog 61 is updated based on a list of functions received from the host 110 that generated the script image 52. In this regard, the code translator 165 generates a list of functions that are in the script image 52 and pre-sorts the list in alphabetical order or some other logical order. In addition to transmitting the script image 52 to the node 23 that is to run the script image 52, the host core logic 152 also transmits the list of pre-sorted function names to such node 23. The node then replaces the function names currently in its function catalog 61 with the newly received list from host 110. The node also defines the pointers for the function catalog 61 based on where each respective function is stored in the node's memory 55.

Note that the core function 51 for storing the script image 52 in memory 55 and updating the function catalog 61, as described above, stores the script image 52 in the language native to the virtual machine 53. Thus, no translation of the script image 52 is performed by the operations that write and read the script image 52 to and from memory 55. For example, when the virtual machine 53 is implemented as a Python bytecode interpreter, as described above, the code defining the script image 52 is stored in memory 55 as a Python data type. Thus, when the script image 52 is stored in memory 55, it can be executed by the virtual machine 53 without any further translation.

In one exemplary embodiment, the host 110 has an address within the network 20 such that the host 110 is essentially another node of the network 20. Indeed, as shown by FIG. 4, the host has a virtual machine 53 and core functions 51, like the other nodes 21-24 of the network 20. Thus, any node 21-24 of the network 20 can transmit a script image 52 to the host 110, which executes the script image 52 via its virtual machine 53. Accordingly, the resources of the host 110, such as the network interface 179, are available to the other nodes 21-24 of the network 24. In addition, although not shown in FIG. 4 for simplicity of illustration, the host 110, like any of the other nodes of the network 20, may comprise a function catalog 61, configuration parameters 63, and a packet buffer 65.

Figure 5:
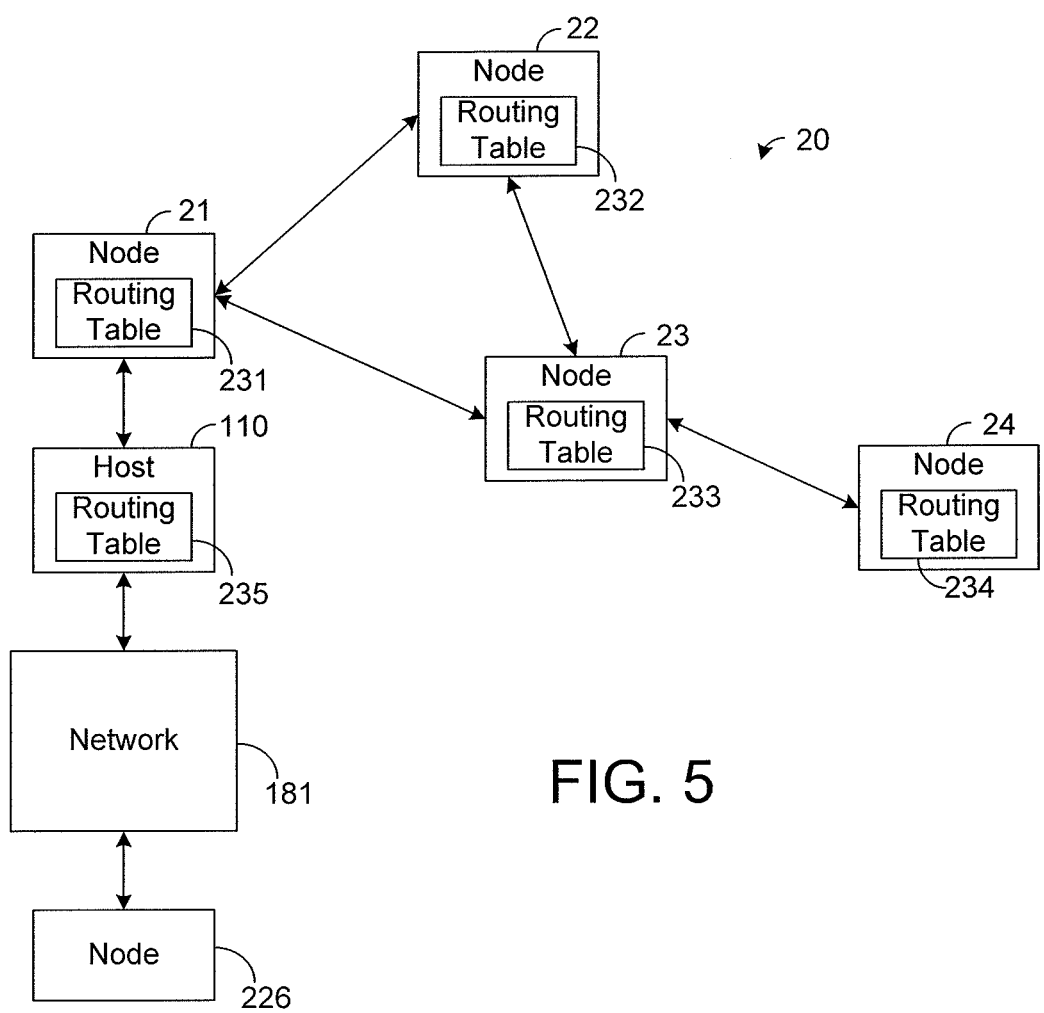
FIG. 5 is a block diagram illustrating an exemplary wireless network in accordance with the present disclosure.

For example, FIG. 5 depicts an embodiment in which a node 226 of the network 20 is located remotely from the other nodes 21-24 and host 110. As shown by FIG. 5, each node 21-24 and host 110 have routing tables 231-235, respectively. The routing tables 231-235 include information indicative of the routes that messages are to take in the network 20. Each node 21-24, including host 110, uses its respective routing table to determine how to define the header information of a packet depending on the packet's destination. The use of routing tables is generally well-known in network communications.

The node 226 is communicatively coupled to the host 110 via a network 181, such as the Internet. As described above, the host core logic 152 may communicate with the network 181 via the network interface 179 (FIG. 4). In one exemplary embodiment, the node 226 transmits messages to other nodes 21-24 through the network 181 and the host 110, and any of the nodes 21-24 may transmit messages to the node 226 through the host 110 (which as indicated above is one of the nodes of the network 20) and the network 181. Exemplary techniques for achieving such communication will be described in more detail below.

In this regard, to join the network 20, the node 226 is aware of the address of the host 110 for the network 181 (e.g., entered or selected by a user of the node 226). For example, if the network 181 is an Internet Protocol (IP) network, then the node 226 is aware of the IP address of the host 110. Note that the host's IP address is different than the host's address for the network 20. In this regard, to route a message to the host 110, the other nodes 21-24 use the host's address for the network 20. As described in more detail herein, in one exemplary embodiment, the address of a node of the network 20 is a portion of the node's media access control (MAC) address. Thus, the host 110 has an address for network 20 that is a portion of the host's MAC address, and the host 110 has an entirely different IP address used by the network 181 to route messages to the host 110. In other embodiments, other types of addresses may be used.

Using the IP address of host 110, the node 226 transmits a message through the network 181 for informing the host 110 of the node's presence. The message includes the address of the node 226 for the network 20 and the address of the node 226 for the network 181. As described above, in one embodiment, the address of the node 226 for the network 20 is a portion of the MAC address for the node 226.

Upon receiving the message 110, the host core logic 152 is configured to update the routing table 235 of the host 110 to include the address of the node 226 for the network 20. The other nodes 21-24 of the network 20 may discover the node 226 by broadcasting a route discovery message, as will be described in more detail hereafter. Other techniques for discovering nodes and updating routing tables are possible in other embodiments.

If any node 21-24 is to transmit a message to the node 226, such node 21-24 transmits a message that is routed to the host 110. The host core logic 152 is configured to encapsulate the message in one or more packets compatible with the network 181. For example, if the network 181 is the Internet as described above, then the core logic 152 is configured to encapsulate the message in one or more Transmit Control Protocol/Internet Protocol (TCP/IP) packets and to include the address of the node 226 for the network 181 in such packets. Note that the core logic 152 may encapsulate just the payload data of the packets of the network 20 defining the message, or the core logic 152 may encapsulate portions of the header information as well, if desired. The host control logic 110 then transmits the TCP/IP packet to the network 181, which routes this packet to the node 226. The node 226 depacketizes the TCP/IP packet to recover the original message.

Accordingly, packets can be transmitted by any of the nodes 21-24, 110 and host 110 to the node 226 utilizing the network 181 and resources of the host 110. Note that the use of the network 181 is transparent to the nodes 21-24. In this regard, when a node 21-24 desires to transmit a message to the remote node 226, the node 21-24 uses the address of the node 226 for the network 20. Thus, the transmitting node 21-24 transmits the message as if the node 226 is coupled directly to the host 110 without an intervening network 181. Further, it is unnecessary for the transmitting node 21-24 to be aware of the address of the node 226 for the network 181 or even to be aware of the presence of the network 181. Moreover, the host 110 handles the interfacing of the message with the network 181.

Note that the node 226 can transmit a message to any of the nodes 21-24, 110 in the reverse direction. In this regard, the node 226 defines a message to be transmitted and packetizes the message using a protocol compatible with the network 181. Further, the node 226 includes the address of the destination node. The node 226 transmits the data packet or packets through the network 181 to the host 110, and the host core logic 152 depacketizes such data packets to recover the message to be transmitted to the destination node 21-24. The host 110 then packetizes such message using a protocol compatible with the network 20 and transmits the data packet or packets formed by the host 110 to the node 21, which routes the message through the network 20 as appropriate. Thus, any of the nodes 21-24 can communicate in either direction with the remote node 226 using the host 110 and network 181 even though the presence of the network 181 is transparent to such nodes 21-24.

Figure 6:
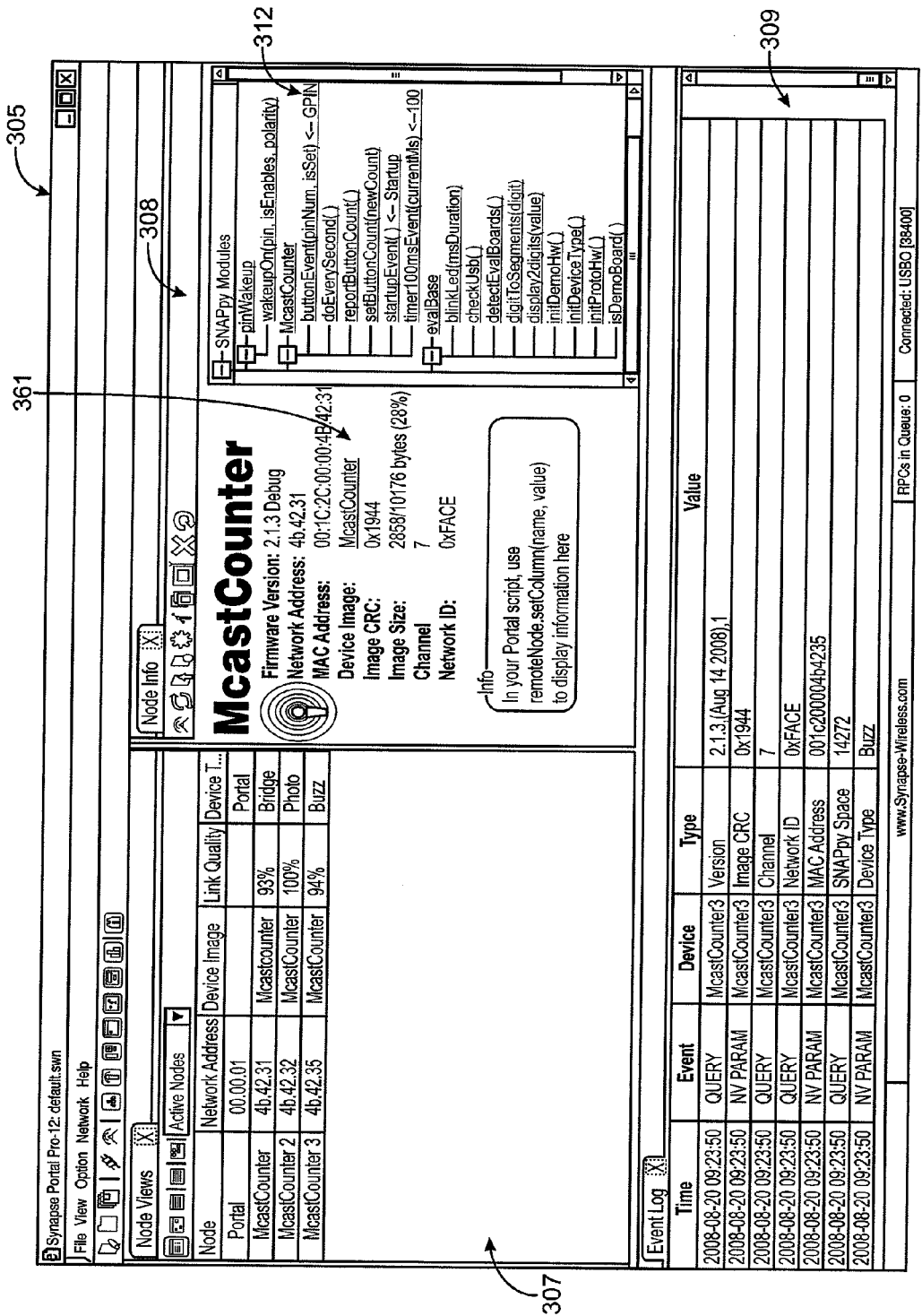
FIG. 6 is a diagram illustrating an exemplary graphical user interface (GUI) for displaying information about the configuration of a network, such as is depicted in FIG. 3.

In addition to enabling extension of the network 20 across another network 181, the host 110 can be used to monitor the network 20 and/or change the configuration and behavior of the network 20, as will be further described hereafter. As shown by FIG. 4, the host 110 comprises GUI logic 166 that is configured to display a GUI to a user. FIG. 6 depicts an exemplary GUI 305 displayed by the GUI logic 166. The exemplary GUI 305 of FIG. 6 has at least three windows 307-309. Other numbers of windows are possible in other examples.

Window 307 lists the nodes of the network 20. In this regard, for each node, the window 307 includes various information, such as the node's name, the node's address within network 20, the name of the script image 52, if any, stored at the node, the quality of the network communication link recently used by the node, and the device type of the node. Other types of information can be indicated in other examples.

Note that the node name can be defined by the user of the host 110 or otherwise. In one exemplary embodiment, a default name is randomly assigned to each node such that each node is assigned a unique name. If the user of the host 110 desires to change any of the default names, the user provides inputs, via the user input interface 176, for changing the default names. In response, the core logic 152 updates the node name as specified by the user. In one exemplary embodiment, the name of a given node is stored in the node. In such an embodiment, when the user changes a node name, the host core logic 152 transmits, to the node identified by the updated name, a remote procedure call for updating the node's name. Thus, the node name stored at the node is updated.

The device types can be defined and categorized in any useful manner. In one exemplary embodiment, a device type of "Portal" refers to a node, such as host 110, that can interface with a user in order to monitor and change the configuration and behavior of the network 20. A device type of "bridge" refers to a node, such as node 21, that has a direct link to a Portal node. A bridge node can be used by a Portal node to communicate with other nodes of the network 20. In one exemplary embodiment, each Portal node is coupled to a bridge node via a physical medium, such as a RS-232 connection. As an example, a Portal node may be implemented as a personal computer that is coupled to a bridge node in order to enable communication with other nodes of the network 20. In such an example, the personal computer has an address for the network 20 that can be used by the other nodes of the network 20 to communicate with the personal computer via the network 20. Other types of devices may be used to implement a Portal node in other embodiments.

In one exemplary embodiment, the host 110 receives the information displayed in the window 307 from the nodes of the network 20. In this regard, in order to discover the topology of the network, the host control logic 110 transmits a multicast message instructing each node 21-24 receiving the message to reply with information, referred to as "node status information," which includes at least the information displayed in window 307. This multicast message is received by the node 21, which then broadcasts the message to the other nodes 22-24 of the network 20. Upon receiving the message, each node 21-24 rebroadcasts the message, since it is a multicast message, and also replies with a unicast message for the host 110. In this regard, the node uses the source address (which identifies the host 110 in this example) from the multicast message for addressing the unicast message for the host 110. The unicast message includes, as payload data, the node status information requested by the multicast message, such as the name of the node, the address of the node, the name of the script image 52, if any, at the node, the most recent network link quality for the node, and the node's device type.

Using the user input interface 177 (e.g., a mouse), the user can select any of the nodes listed in the window 307, and the selected node is highlighted. For example, in FIG. 6, a node named "McastCounter" is selected by a user and, therefore, appears highlighted in the window 307. Information about the selected node is also displayed in the window 308. In the exemplary embodiment depicted by FIG. 6, the information displayed for the selected node includes the node name, the version of firmware running on the node, the node's address for network 20, the node's media access control (MAC) address, the node's device type, the name of the node's script image 52 (referred to as "device image" in the GUI 305), if any, a cyclical redundancy check (CRC) value for the script image 52, if any, the byte size of the script image 52, if any, the channel identifier for the channel on which the node is currently communicating, and the node's address within the network 20. Such displayed information within window 308 may be part of the node status information returned to the host 110 during network discovery. Note that a network discovery can be initiated at anytime by the user of the host 110 or otherwise (e.g., automatically) in order for the host 110 to refresh its network topology to account for nodes that may join or leave the network 20 from time-to-time. In other embodiments, other types of information may be displayed by window 308.

The CRC value within the node status information transmitted to the host 119 is the result of a calculation performed on the bytecode script image 52 at the node in which the script image 52 is stored. Thus, as will be described in more detail hereafter, by performing the same calculation on a version of the script image 52 and comparing the result of this calculation to the CRC value stored at the node, it is possible to determine whether the foregoing version matches the script image 52 stored at the node.

Also shown in window 308 for the selected node, "McastCounter," is a list 312 of function names for the core functions 51 as well as the functions defined by the script image 52 stored at the node. Similar to the other information displayed by window 308, the list 312 may be part of the node status information returned to the host 110 during network discovery. In one exemplary embodiment, the list 312 is based on the function catalog 61 stored at the selected node. In this regard, the multicast message transmitted by the host 110 during network discovery defines a remote procedure call that invokes at least one of the core functions 51. This core function 51 retrieves the node status information, including the function names stored in the function catalog 61, and transmits such retrieved information to the host 110. The node status information retrieved and transmitted by the core function 51 is then displayed in the window 308 of GUI 305 when the user selects the name of the node in the window 307.

Alternatively, the function catalog 61 may be stored at the host 110 such that retrieval of the function catalog 61 from the selected node is unnecessary. As described above, the function catalog 61 can be created by the host 110 when generating the bytecode script image 52 from a script source 161. The host core logic 152 may be configured to archive each function catalog 61 for the various nodes configured by the host 110. In such case, the function names displayed in window 308 can be retrieved from the host's memory 155 without being retrieved from the selected node. Other types of node status information may be similarly archived by the host 110 such that retrieval of such information from the nodes is unnecessary.

The window 309 displays information about various events that have occurred at the node selected in window 307. Each event is time stamped. The displayed events could include messages received from other network nodes and/or events detected by the script image 52 running at the selected node. Such events are logged at the selected node and transmitted to the host 110.

Figure 7:
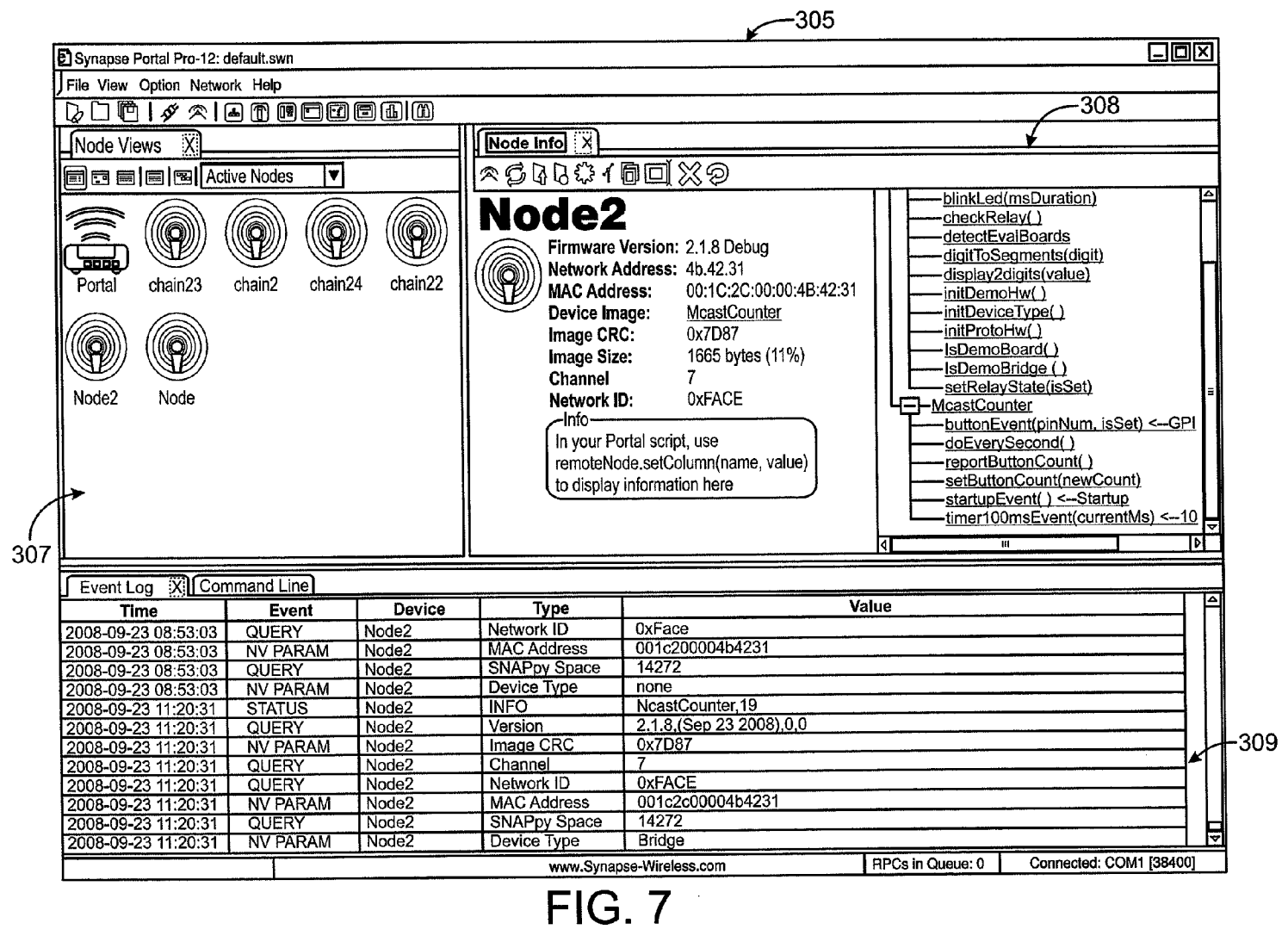

Note that the GUI 305 may be displayed in various formats. For example, FIG. 7 shows an exemplary iconic GUI 305 in which the network nodes are represented by icons in window 307. Various other formats are possible in other examples.

In one exemplary embodiment, the function names in the window 312 are selectable hyperlinks. When the user selects the hyperlink for one of the function names via the user input interface 177, the host core logic 152 transmits a unicast message to the node identified by the information being displayed in the window 308. The unicast message comprises a remote procedure call for the selected function. Upon receiving the message, the function identified by the remote procedure call is invoked and executed. Thus, selecting the function name displayed by the host 110 results in execution, at the remote node (i.e., the node selected in window 307), of the selected function.

Figure 8:
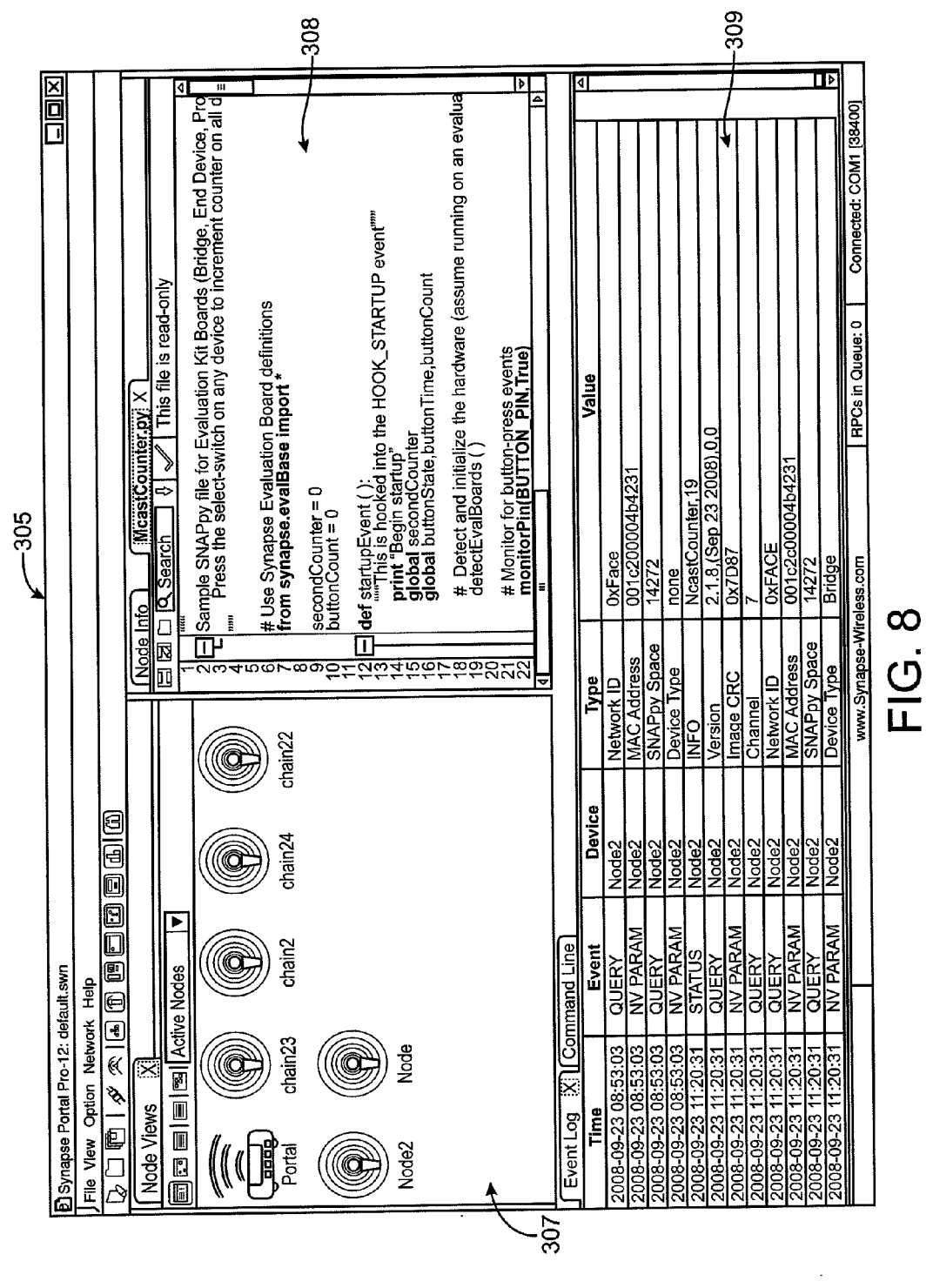

In addition, the script name displayed within window 308 also appears as a selectable hyperlink 361. When the hyperlink 361 is selected, the host core logic 152 displays the script source 161 of the identified script to the user, if such script source 161 is available to the host 110. In one exemplary embodiment, the script source 161 is displayed in a new window 308, as shown by FIG. 8. Note that there are a variety of techniques that may be used by the host core logic 152 to locate and display the script source 161 requested by the user via selection of the script name in the window 308 or otherwise.

In one exemplary embodiment, the script source 161 for each script image 52 generated by the host 110, as well as the generated script image 52, are retained in memory 155 and correlated with an address of the node to which the script image 52 is pushed by the host 110. Note that the memory 155 may include disks that can be transmitted from one computer system to another. The script source 161 is accessible to the host core logic 152 so that the script source 161 can be retrieved if it is later requested by a user of the host 110. However, before displaying the script source 161 in response to the request, the host core logic 152 firsts performs at least one test to determine whether the version of the script source 161 stored at the host 110 is obsolete. If so, the host core logic 152 warns the user.

For example, assume that the user requests the script image 52 stored at the node 23. As described above, the host 110 for each node retains the node's script image 52 generated at the host 110. In one exemplary embodiment, when the user requests the script image 52 stored at the node 23, the host core logic 152 is configured to retrieve the script image 52 for the node 23 stored at the host 110. The logic 152 is further configured to calculate a CRC value based on the retrieved script image 52 and to compare this calculated CRC value to the CRC value provided by the node 23 during network discovery or otherwise. Note that all nodes of the network 20 are configured to calculate CRC values according to the same algorithm. Thus, if the CRC value calculated by the host core logic 152 matches the CRC value from the node 23, then the core logic 152 determines that the script image 52 stored at the host 110 for the node 23 matches the script image 52 stored at the node 23. Thus, the logic 152 assumes that the corresponding script source 161 for the node 23 (i.e., the script source 161 from which the script image 52 at node 23 was originally generated) stored at the host 110 is not obsolete. However, if the two CRC values do not match, then the logic 152 assumes that the script image 52 stored at the host 110 for the node 23 does not match the script image 52 stored at the node 23. In such case, the core logic 152 determines that the corresponding script source 161 for the script image 52 stored at the host 110 is obsolete and warns the user.

In another embodiment, each time a script image 52 is pushed to a network node, the script source 161 from which the script image 52 was generated is also pushed to and stored at the node. Thus, the host 110 can request retrieval of a node's script source 161 directly from the node. Further, each time the node's script is updated, the source code is updated (e.g., replaced with the source code from which the uploaded script was generated). Thus, in such an embodiment, the script source 161 stored at the node should never be obsolete.

In any event, when a user requests a node's script source 161, the host core logic 152 is configured to locate and display the requested script source 161. The user may change the script source 161 in any desired manner. Once the script source 161 changes are complete, the user submits a request for the script source 161, as changed by the user, to be uploaded to a node. The user may specify that the modified script source 161 is to be uploaded to the same node identified within the window 308, or the user may specify that the modified script source 161 is to be uploaded to other nodes or a group of nodes. In response to the user's request, the core logic 152 invokes the source parser 164 and code translator 165 to convert the modified script source 161 into a tokenized script image 52 that can be executed by the nodes. The logic 162 then uploads the script image 52 to the identified node, and this node replaces its current script image 52 with the new script received from the host 110.

As a mere example, assume that the script source 161 for the script image 52 running on the node 23 is displayed to the user and that the user has modified this source code 161. Further assume that a script image 52 generated from the modified script source 161 is to replace the script image 52 currently running on the node 23. In one exemplary embodiment, the core logic 152 transmits, to the node 23, a unicast message defining a remote procedure call for one of the core functions 51 that causes the node to stop executing its script image 52. The core logic 152 then transmits, to the node 23, another unicast message defining a remote procedure call for one of the core functions 51 that erases the script image 52 currently stored at the node 23. The core logic 152 then transmits another unicast message to the node 23 defining a remote procedure call for one of the core functions 51 that writes data to the node's memory 55. The core logic 152 also transmits the new script image 52 to the node 23 via at least one unicast message such that the function 51 invoked by the foregoing remote procedure call writes the new script image 52 to the memory 55. The core logic 152 also transmits a unicast message to the node 23 defining a remote procedure call for one of the core functions 51 that causes the node 23 to reboot.

Thus, via execution of the core functions 51 called by the foregoing remote procedure calls, execution of the current script image 52 is stopped, the current script image 52 is erased from memory 55, the new script image 52 is written to memory 55, and the node 23 is rebooted. After the reboot, the new script image 52 runs such that the functionality of the node 23 is controlled by the new script image 52. In a similar manner, the script image 52 stored at any node of the network 20 can be updated as may be desired in order change the behavior of such node.

To illustrate the ease at which the behavior of the network 20 can be defined and modified, assume that a user wishes to monitor the sensor 125 (FIG. 3) in one part of a manufacturing facility and to turn on a light in another part of the facility based on the sensor 125. Assume that the user has a personal computer that he intends to use as the host 110. The user purchases the nodes 21-24 and sets them up in his facility as may be desired. For example, assume that the user couples node 21 to the host 110, and he couples node 24 to the sensor 125 and node 22 to the apparatus 126, as shown by FIG. 3. The user also downloads a suite of software including the core functions 51, virtual machine 53, stack 54, source parser 164, code translator 165, and core logic 152 to the host 110. Once the nodes 21-24, 110 are powered up, they are able to communicate as a mesh network 20. In this regard, the nodes 21-24, 110 automatically communicate with one another to learn of each other's presence on the network 20 and to define routing tables for routing unicast messages through the network 20.

In addition, the core logic 152 of the host 110 discovers the topology of the network 20 by broadcasting a multicast message that is rebroadcast by the nodes 21-24. Each node 21-24 replies with a unicast message including various node status information, as described above. Thus, the core logic 152 learns the topology of the network 20 and displays a list of the nodes 21-24 in a GUI 305.

Within the window 307, the user selects the name of the node 24 that is coupled to the sensor 125. In response to such selection, the node status information for this node 24 is displayed in window 308. Since a script image 52 has yet to be defined for this node 24, only the names of the core functions 51 are displayed. The user then provides an input indicating that he would like to define a new script. In response, a window is created in which the user can write script source 161 to define the new script. Upon completion, the source parser 164 and code translator 165 convert the script source 161 to a tokenized script image 52, which can be executed on the node 24. The script image 52 is assigned the same name as the script source 161 and is transmitted through the network 20 to the node 24. In addition, the code translator 165 generates a list of function names that are within the script image 52 and pre-sorts the function names in alphabetical order or some other type of order. This list of function names is also transmitted to the node 24.

The node 24 stores the script image 52 in memory 55, and the function catalog 61 of the node 24 is updated to include the list of function names received from the host 110 and the associated pointers. The node 24 is then rebooted. Upon reboot, the script image 52 begins running and, therefore, in the instant example begins monitoring the sensor 125. Note that the communication of the script image 52 through the network 20 is transparent to the user. In this regard, the user simply identifies which node 24 is to receive the script image 52, and the script image 52 is automatically transmitted as requested.

Similarly, the user may define and push, to the node 126, a script image 52 for controlling the apparatus 126. For example, the script image 52 may define a function, called "Light_On," that is called by the script image 52 of the node 24 when such script image 52 senses activation of the switch 125. In the instant example, the called function activates the apparatus 126 such that it begins emitting light. Thus, when the script image 52 of the node 24 detects activation of the sensor 125, the script image 52 transmits to node 22 a remote procedure call that calls the function "Light_On." Upon execution of the remote procedure call, the virtual machine 53 of the node 22 checks the function catalog 61 of such node 22 for the function name "Light_On." Upon locating such name, the virtual machine 53 invokes the named function, which causes the apparatus 126 to emit light. At any time, the scripts 52 at either of the nodes 22 and 24 may be updated to implement new functionality according to techniques described above.

Note that the use of remote procedure calls to invoke new functions facilitates the dynamic configurability of the network 20. In this regard, the format for a remote procedure call includes as payload data the name of a procedure to be called. The remote procedure call also includes overhead information that identifies the message as being a remote procedure call. Thus, each remote procedure call is of the same message type in which the data carried by the message can be controlled in order to reference a particular function or script. Therefore, when a new function is defined, it is unnecessary to create a new message type in order to invoke the function. In this regard, to invoke the function, a remote procedure call, which is of a message type known by all of the network nodes, can be generated, and the name of the new function can be inserted into the data portion of the message. Each node, upon identifying the message as a remote procedure call based on the message's overhead, is configured to read this data portion and then compare the read data to the function list defined by the function catalog 61 in an effort to locate the address of the function to be executed in response to the remote procedure call. Accordingly, a remote procedure call can be used to invoke a newly defined function, and it is unnecessary for the user who writes a new function to define a new message type or even be aware of the communication protocols used by the network 20.

It should be noted that there are various techniques that may be employed to enable the network 20 to operate more efficiently and otherwise better. For example, in one exemplary embodiment, purging of the routing tables is controlled in an effort to reduce the occurrences of route discoveries.

In this regard, as described above and shown by FIG. 5, the nodes 21-24 and 110 have routing tables 231-235 that indicate data paths for messages to be communicated through the network 20. To better illustrate aspects of packet routing, exemplary techniques for defining the routing tables 231-235 will be described in more detail below. However, it should be emphasized that various other techniques may be used to define the routing tables 231-235.

Referring to FIG. 5, assume that the node 22 has already discovered a data path to node 24. In this regard, assume that the routing table 232 indicates that a message destined for the node 24 is to hop through the node 23. In particular, there is an entry for each route indicated by the table 232. The entry for the data path to the node 24 includes the address of node 24 as the destination and the address of the node 23 as the next hop in order to reach such destination. Note that there is no need for the table 232 to include the addresses of other hops, if any, along an indicated data path.

If the node 22 is to transmit a message to the node 24, the node 22 transmits a message via at least one data packet. The data packet has a header, which includes a destination address that identifies node 24 and a hop address that identifies node 23. In addition, the routing table 233 of node 23 indicates that a message destined for the node 24 may be communicated directly to the node 24. Thus, when the node 23 receives the foregoing data packet destined for the node 24, the node 23 forwards the packet to the node 24 by changing the hop address to identify node 24 and then retransmitting the packet. In such an example, the node 22 is the source node, the node 24 is the destination node, and the node 23 is a routing node, since a packet from the source to the destination is routed through the node 23. Note that in other examples, there may be more than one routing node.

Now assume that the node 21 has yet to discover a route to the node 24 but desires to communicate with this node 24. Also assume that the node 21 is not within range of the node 24. Therefore, direct communication between nodes 21 and 24 is not possible. To discover a route to the node 24, the node 21 broadcasts a message, referred to hereafter as a "route discovery message." In one exemplary embodiment, the route discovery message is rebroadcast like a multicast message and includes the network address of the node 21 that originally broadcast the message. The route discovery message also includes the network address of the node 24, referred to as the "destination node," for which a route is being sought.

When a node, referred to as the "receiving node," receives a route discovery message, the receiving node determines whether it is the destination node. If it is not the destination node, then the receiving node rebroadcasts the message. However, unlike many other multicast messages, the receiving node includes its own identifier in the rebroadcast message. Thus, the route discovery message, when it is ultimately received at the destination node, will include the network address of the node 21 that originally broadcast the message and the addresses of all of the hops from such node 21 to the destination node 24. Therefore, the message indicates a complete route from the node 21 to the destination node 24. The hop addresses included in the route discovery message are used to enable duplicate filtering of the route discovery message. In this regard, if any of the hop nodes identified in the message receives the message from another node of the network 20, the hop node, in response to its own identifier in the message, refrains from rebroadcasting the message. Thus, the destination node 24 is prevented from receiving multiple instances of the same route discovery message from the same hop node.

The node receiving the route discovery message may be configured to update its own routing table based on such message. In this regard, in one exemplary embodiment, if the routing table of the receiving node does not indicate a route for the node 21 that originally transmitted the route discovery message, then the receiving node updates its routing table to include an entry for the original transmitting node 21. The receiving node also updates such entry to include the address of the next hop for the route to the original transmitting node 21 based on the addresses in the route discovery message. In this regard, the address of the next hop included in the routing table entry is the address from which the route discovery message was directly received (i.e., the address of the last hop for the route discovery message). Thereafter, the entry may be later used to transmit a message to the node 21 that originally transmitted the route discovery message.

If the node receiving the route discovery message determines that it is the destination node identified in the message, then the node responds to the route discovery message with a unicast message to the node 21 that originally broadcast the route discovery message. In this regard, the unicast message identifies the original transmitting node 21 (i.e., the source of the route discovery message) and the address of the next hop, which is the same node from which the route discovery message was directly received by the destination node 24. Therefore, the message is routed through the path defined by the addresses in the received route discovery message to the node 21 that originally broadcast the route discovery message. This node 21 then updates its routing table 231 to appropriately indicate the route to the destination node 24. In this regard, the node 21 creates an entry in its routing table 231 and includes the address of the destination node 24. The node 21 also includes the address of the next hop, which is the node from which the unicast message was directly received (i.e., the address of the last hop node for the unicast message prior to being received by the node 21). Note that each unicast message communicated in the network 20 preferably includes the address of the transmitting node (i.e., the node from which the message is being transmitted) and, therefore, the address of message's last hop.

In the instant example, assume that the routing table 231 of the node 21 indicates that messages destined for the node 24 are to be routed through the node 23, which is configured to route such messages directly to the node 24. Thus, if a message is to be transmitted to the node 24, the node 21, based on the routing table 231, transmits at least one packet that identifies the node 24 as the destination and the node 23 as the next hop. Upon receiving the packet, the node 23 forwards the packet to the node 24 based on its routing table 233 by changing the next hop address to that of the node 24.

Note that the amount of memory used for storing a routing table is finite. Thus, purging of routing table entries is needed in some situations in order to add more entries for new data paths not already indicated by the routing table. To better illustrate this aspect, refer to FIG. 9, which depicts an exemplary routing table 234 for the node 24. In the exemplary embodiment of FIG. 9, the routing table 234 has sufficient memory for ten entries in which each entry indicates a different data path. In this regard, each entry correlates a destination address ("Dest. Address") with a next hop address ("Hop Address"). Each received unicast message having a destination address that corresponds to (e.g., matches) a Dest. Address of the routing table 234 is routed to the node identified by the correlated Hop Address.

In the exemplary embodiment shown by FIG. 9, Dest. Addresses 1-10 are respectively correlated with Hop Addresses 1-10. Thus, there are ten entries that are indicative of the data paths for ten different destination addresses. In particular, for each destination address stored in the routing table 234, the routing table 234 indicates the address of the next hop for a unicast message having such destination address. In other embodiments, the routing table 234 may be capable of storing other numbers of entries and/or other types of information in any of the entries.

In the exemplary embodiment of FIG. 9, the routing table 234 is full. That is, each entry of the table 234 is storing an address pair (i.e., the Destination Address and Hop Address) indicative of a data path for a particular destination node. In such a situation, upon receiving a unicast message or a broadcast route discovery message having a destination address not corresponding to any of the Dest. Addresses 1-10 stored in the routing table 234, the core logic 80 of the node 24 may be configured to discover a route to the node identified by the destination address of the received message. For example, the core logic 80 may be configured to broadcast a route discovery message and discover the address of the next hop for the message according to the exemplary techniques described above. The core logic 80 also stores an address pair for the newly discovered route in the routing table 234. In this regard, the core logic 80 stores the destination address of the message and the address of the next hop as an address pair in the routing table 234.

In order to add the new entry to a full routing table 234, the core logic 80 purges at least one of the current entries of the routing table 234. For example, the core logic 80 may delete or overwrite one of the previous address pairs so that the new address pair may fit in the routing table 234. In particular, the core logic 80 may overwrite an address pair previously stored in the routing table 234 with the new address pair indicating the destination address of the newly received message and the address of the next hop for such message thereby creating a new entry in the routing table 234 and purging a current entry in the routing table 234. Thus, the overall number of entries in the routing table 234 after the purging of one entry and the adding of another may be the same.

There are various techniques that can be used to select which of the current entries is to be purged. For example, in one embodiment, the core logic 80 is configured to randomly select one of the routing table entries for purging. In another embodiment, the core logic 80 is configured to select for purging the entry that is the most stale (i.e., has not been accessed for routing in the longest amount of time). There are various other techniques and algorithms that may be used to select which of the entries is to be purged.

If the core logic 80 is to purge an entry of the routing table 234 in response to a newly received unicast message or broadcast route discovery message and if the source address of the newly received unicast message corresponds to (e.g., matches) the Dest. Address of an entry of the routing table 234, then the core logic 80 is configured to disqualify such entry from the purging process such that the entry cannot be selected for purging. In such a situation, there is relatively high degree of probability that the node 24 will receive a message destined for the source node in the near future. In this regard, the destination node that receives the foregoing unicast message may be configured to reply in response to such message. If the destination node does reply, then the destination for the reply message will be the source node of the original unicast message. Thus, if the node 24 receives the reply message, the node 24 can utilize the entry having the Dest. Address corresponding to the source address of the original unicast message in order to route the reply message. By disqualifying such entry from purging, the core logic 80 enables the node 24 to appropriately route the reply message without having to broadcast a route discovery message thereby helping to reduce the traffic on the network 20. That is, since the entry is not purged from the routing table 234, the core logic 80 can utilize the entry to route the reply message to the appropriate next hop without broadcasting a route discovery message in order to discover an appropriate route for the reply message.

Figure 10:
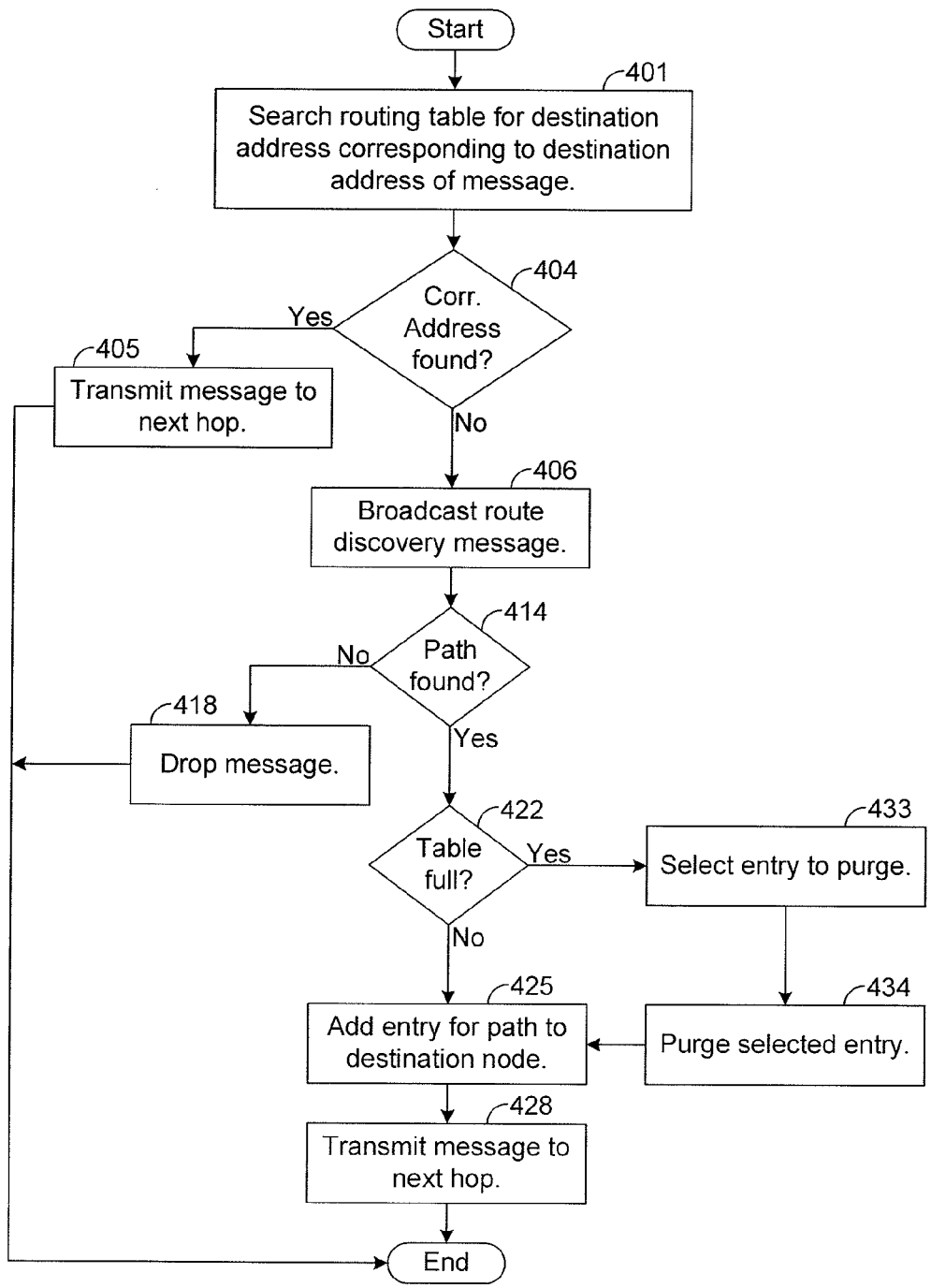
FIG. 10 is a flow chart illustrating an exemplary method for purging an entry of a routing table.

An exemplary operation of the network will now be described with particular reference to FIGS. 10 and 11.

For illustrative purposes, assume that the node 22 (FIG. 5) transmits a unicast message destined for the node 24. Further, assume that the message has a source address identifying the node 22, a hop address identifying the node 23, and a destination address identifying the node 24. Upon receiving the message, the node 23 recognizes itself as being a hop node for the message based on the message's hop address. Thus, the core logic 80 of the node 23 processes the message according to FIGS. 10 and 11.

In particular, the core logic 80 consults its routing table 233 to determine whether the table 233 is indicative of a data path to the node 24 identified by the message's destination address. In this regard, the core logic 80 searches for the an entry in the routing table 233 including a destination address that corresponds to (e.g., matches) the destination address of the received message, as shown by block 401 of FIG. 10. If the core logic 80 finds a corresponding destination address in the routing table 233, then the core logic 80 transmits the message to the next hop, as shown by blocks 404 and 405 of FIG. 10. In this regard, the core logic 80 changes the hop address of the message to the hop address correlated with the corresponding destination address by the routing table 233 and then wirelessly transmits the message.

For illustrative purposes, assume that the message is to be transmitted from the node 23 to the node 24. In such a case, the hop address correlated with the destination address identifying the node 24 also identifies the node 24. Thus, both the hop address and the destination address of the message transmitted by the node 23 identify the node 24. Accordingly, the node 24 receives and responds to the message as appropriate. For example, the node 24 may transmit a unicast message, referred to hereafter as the "reply message," back to the source node, which is node 22 in the current example.

However, in the instant example, assume that the routing table 233 does not indicate a data path for the node 24 when the unicast message transmitted from the node 22 is received by the node 23. In such as situation, the routing table 233 does not store a destination address corresponding to the destination address of the message. Thus, the core logic 80 may attempt to discover a route to the destination node 24. In this regard, the core logic 80 may broadcast a route discovery message, which is processed by the other nodes of the network 20 according to exemplary techniques described above. If the core logic 80 of the node 23 is unable to discover a data path to the destination node 24 via a route discovery process, then the core logic 80 takes some action, such as dropping the unicast message, as shown by blocks 414 and 418 of FIG. 10. If desired, the core logic 80 of the node 23 may transmit a message back to the source node 22 indicating that the original unicast message was unable to be delivered. In such a situation, the source node 22 may attempt to discover a new path to the destination node 24 and/or may attempt a retransmission of the unicast message. Various other techniques may be implemented to handle a failure in the delivery of the unicast message.

In the instant example, assume that the core logic 80 of the node 23, based on the route discovery message communicated via block 406, discovers a data path to the destination node 24. In this regard, assume that the core logic 80 discovers that the destination node 24 is the next hop along such path. In such a situation, the core logic 80 of the node 23 determines whether the routing table 233 is full, as shown by block 422 of FIG. 10. If not, the core logic 80 adds an entry to the routing table 233 indicating the newly discover data path, as shown by block 425. For example, in the instant case, the core logic 80 of the node 23 may add an entry that has a destination address identifying the node 24 and a hop address that identifies the node 24 indicating that a message destined for the node 24 is to be transmitted directly to the node 24. The core logic 80 also transmits the message to the next hop, as shown by block 428. In the instant example, the next hop is the destination node 24, and the core logic 80 transmits the message to the destination node 24. That is, the core logic 80 re-transmits the unicast message received from the node 22 changing the hop address of such message to identify the node 24.

For illustrative purposes, assume that the routing table 233 is full when the node 23 receives the unicast message from the node 22. In such a case, the core logic 80 selects one of the existing entries in the routing table 233 for purging and purges the selected entry, as shown by blocks 433 and 434 of FIG. 10, to enable addition of the new entry for a data path to the destination node 24 in block 425.

Various types of techniques may be used to select an entry for purging in block 433. FIG. 101 depicts an exemplary method for selecting an entry for purging. In other embodiments, other methods for selecting an entry for purging are possible.

Figure 11:
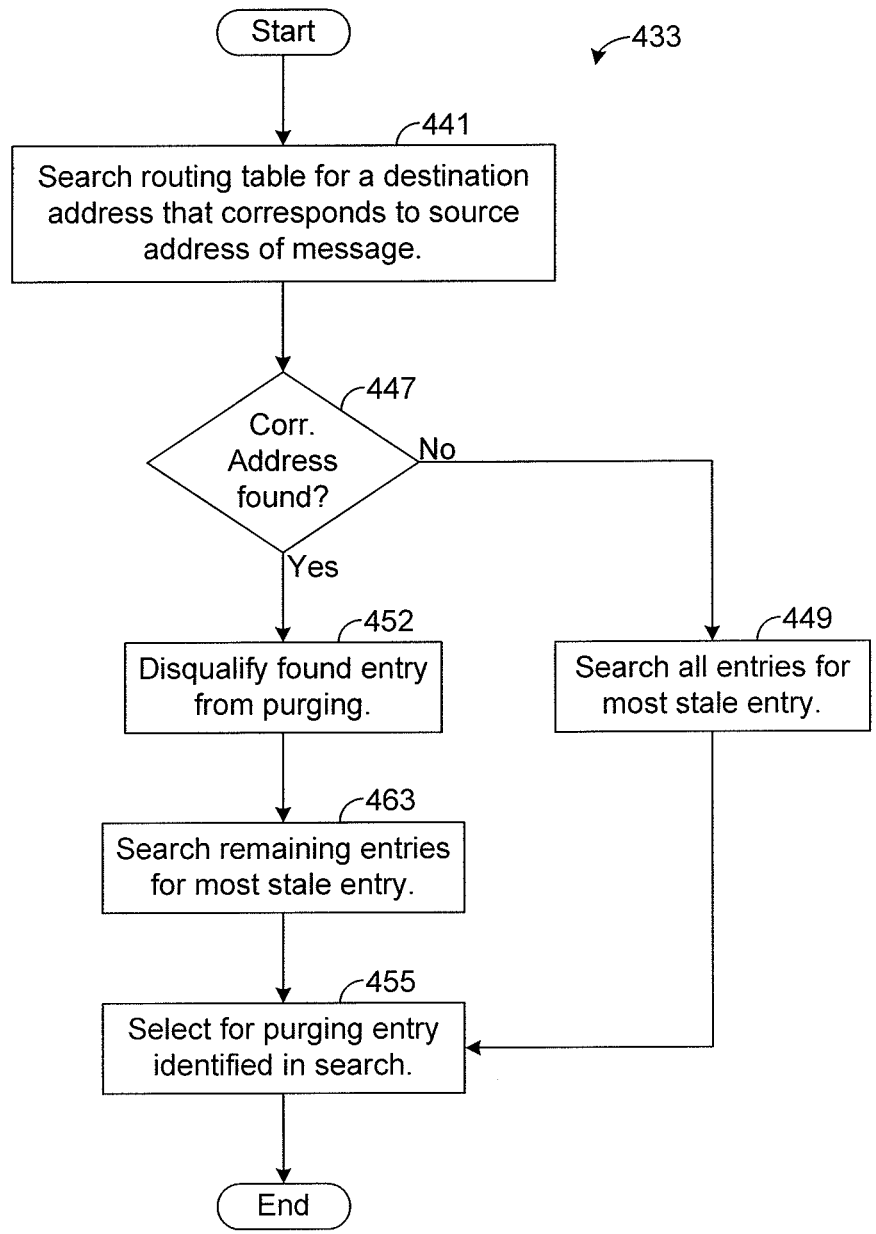
FIG. 11 is a flow chart illustrating an exemplary method for selecting a routing table entry for purging.

As shown by block 441 of FIG. 11, the core logic 80 of the node 23 searches the routing table 233 for a destination address corresponding to (e.g., matching) the source address of the unicast message received from the node 22. If no such corresponding address in the routing table 233 is found, then the core logic 80 performs some desired algorithm for selecting an entry to be purged. In one exemplary embodiment, assume that the core logic 80 searches all of the entries for the one that is the most stale (i.e., has not been used in the longest amount of time) if an address corresponding to the source address is not found in the routing table 233, as shown by blocks 447 and 449 of FIG. 11. As shown by block 455, the core logic 80 selects the entry identified by the search of block 449 as the one to be purged.

Note that there are a variety of techniques that may be used to determine which of the entries is the most stale. For example, the core logic 80 of the node 23 may correlate each entry with a time value indicating the time at which the entry was last used to route a message. In another example, the core logic 80 may rearrange the locations of the entries based on usage. For example, upon using an entry to route a message, the core logic 80 may move the entry to the front of a buffer so that the entry at the beginning of the buffer indicates the most recently used entry and the entry at the end of the buffer is the most stale entry. There are various other techniques that may be used to indicate which of the entries is the most stale and/or to select an entry for purging from the available entries.

In the instant example, assume that the core logic 80 of the node 23, in performing the search of block 441, finds an entry having a destination address corresponding to (e.g., matching) the source address of the received unicast message. It is likely that such an entry may be needed in the near future. In this regard, it is likely that any reply message transmitted by the destination node 24 may be routed through the node 23 since the node 23 is being used to route the original unicast message transmitted by the node 22. In an effort to increase the efficiency of the network 20 and to reduce traffic on the network 20, the core logic 80 of the node 23 disqualifies the entry identified by the search of block 441 from the purging. That is, the core logic 80 ensures that the entry having the destination address corresponding to the message's source address is not purged in response to the message. The core logic 80 then selects among the remaining entries for an entry to be purged. For example, the core logic 80 may search the remaining entries for the one that is most stale, as shown by block 463. Note that the disqualified entry may not be identified by the search of block 463. As shown by block 455, the core logic 80 selects the entry identified by the search of block 463 as the one to be purged.

It should be noted that there are various techniques that may be used to disqualify an entry from the purging. For example, if the core logic 80 is configured to track the most stale entry by moving entries to the front of a buffer upon use, as described above, then the core logic 80 may be configured to move a disqualified entry to the front of the buffer or other location so that it is not identified as the most stale entry in block 463. By moving the entry to the front of the buffer, the core logic 80 changes the status of the entry such that it is now deemed the most recently accessed entry. This has the effect of keeping the entry from being purged for an extended period time or at least for several more purges of the routing table 233. Such effect may be beneficial since the routing table 233 may be further purged one or more times before a reply is received for the message currently being routed.

In one exemplary embodiment, each entry of the routing table 233 is correlated with a status indicator, referred to hereafter as a "purge status indicator," indicating whether the entry is disqualified from purging. For example, the purge status indicator may a one bit indicator that, if asserted, indicates that the entry is not available for purging. In such an embodiment, the core logic 80 may be configured to assert, in block 452, the purge status indicator of the entry having the destination address corresponding to the source address of the message. The core logic 80 may also be configured to deassert the other purge status indicators for other entries that are not disqualified from the purging. Thus, when searching in block 463, the core logic 80 may be configured to only consider the entries having a purge status indicator that is deasserted. In other embodiments, other types of purge status indicators and other techniques for indicating which of the entries are disqualified from purging are possible. Further, if desired, the core logic 80 may be configured to disqualify one or more of the entries from purging based on other reasons or factors in addition to or in lieu of the source address of the received message.

In one exemplary embodiment, a particular type of unicast message, referred to as a "route trace message," may be used to discover information about a route through the network 20 from a source node to a particular destination node. To discover the status or health of the route, a route trace message is transmitted along a route from a source node to a destination node. At each node through which the message passes, the node's address is inserted into the message, and the message is ultimately returned to the source node. Therefore, the message can be analyzed to determine the route that was traversed by the route trace message.

In one exemplary embodiment, link quality information is also inserted into the link trace message as it is traversing the network 20. In particular, when a node receives the message, the node inserts, not only its address, but also the quality of the link from which the message was received by the node. Various types of information may be used to indicate the link quality. In one embodiment, the signal strength of the received route trace message is measured by the communication device 77 (FIG. 2) of the receiving node. The communication device 77 transmits a signal, referred to hereafter as the "energy level signal" indicative of the measured signal strength. Based on the energy level signal, the core logic 80 inserts into the route trace message a value, referred to hereafter as "link quality value," indicative of the quality of the link from which the message was received. In the instant example, the link quality value is indicative of the measured signal strength, but other types of link quality parameters may be indicated by the link quality value. Thus, the route trace message can be analyzed to determine the address of each node along the route traversed by the route trace message and the link quality of each link traversed by the route trace message.

Note that, within the route trace message, each link quality value is respectively correlated with the node address of the node that received the route trace message from the link to which the link quality value pertains. In one embodiment, the foregoing is achieved by contiguously positioning the link quality value for a particular link immediately after the node address for the node that received the route trace message from the particular link. In other embodiments, other techniques for correlating the link quality values to the appropriate node addresses are possible.

An exemplary use of a route trace message will now be described below. It should be emphasized that the below description is exemplary and other techniques for using a route trace message are possible in other embodiments.

For illustrative purposes, assume that a route has been discovered that passes from the node 22 through the node 23 to the node 24. That is, the routing table 232 of the node 22 indicates that the next hop for a message destined for the node 24 is node 23. Further, the routing table 233 of the node 23 indicates that the next hop for a message destined for the node 24 is the node 24. Thus, a unicast message destined for the node 24 is transmitted from the node 22 to the node 23 and then from the node 23 to the node 24. Further assume that routing tables 232-234 also indicate that a message transmitted from the node 24 and destined for the node 22 is to travel the same path in reverse.

For illustrative purposes, assume that it is desirable to determine which nodes are traversed by a unicast message between the nodes 22 and 24 and/or the health of the path between the nodes 22 and 24. The user of the host 110 may submit a user input requesting the transmission of a route trace message between the nodes 22 and 24. In response, a remote procedure call may be transmitted from the host 110 to the node 22 instructing the node 22 to transmit such a route trace message. In response, the core logic 80 of the node 22 creates a route trace message and wirelessly transmits such message via the communication device 77 of the node 22. The route trace message has a source address that identifies the node 22 and a destination address that identifies the node 24. The message also has a message type indicator indicating the type of message being communicated. In the instant example, the message type indicator indicates that the message is a route trace message. Based on the routing table 232 of the node 22, the core logic 80 also inserts a hop address that identifies the node 23.

Upon receiving the route trace message, the communication device 77 of the node 23 measures the signal strength of the message at the time of reception and transmits an energy level signal indicative of the measured signal strength. The core logic 80 of the node 23, based on the hop address, responds to the message. In this regard, the core logic 80 determines, based on the message type indicator, that the message is a route trace message. Thus, the core logic 80 inserts into the message the node address of the node 23 and a link quality value, based on the energy level signal, indicating the measured signal strength of the message at the time of reception by the node 23. Based on the routing table 233, the core logic 80 also determines that node 24 is the next hop, and replaces the hop address of the message with the node address of the node 24. The core logic 80 then transmits the modified route trace message, via the communication device 77 of the node 23, to the node 24.

Upon receiving the route trace message, the core logic 80 of the node 24 similarly responds to the message by inserting the node address of the node 24 and a link quality value indicative of the measured signal strength of the message at the time of reception by the node 24. The core logic 80 also replaces the source address of the message with the node address of the node 24 and replaces the destination address of the message with the node address of the node 22 so that the message will be routed back to the node 22 that originally transmitted the message. Based on the routing table 234, the core logic 80 replaces the hop address with the node address of the node 23. Thus, the route trace message is transmitted to the node 23, which again inserts its node address into the message. The node 23 also correlates this newly inserted node address with a link quality value indicative of the signal strength of the message at the time of reception from the node 24. The node 23 also replaces the hop address with the address of the node 22 based on the routing table 233.

Upon receiving the route trace message, the core logic 80 of the node 22 can analyze the message to identify each hop of the route from the node 22 to the node 24 back to the node 22. The core logic 80 can also analyze the message to determine the quality of each link traversed by the route trace message along such route. In one exemplary embodiment, the core logic 80 transmits to the host 110 a message having information indicative of the route and/or the quality of links along the route, and the host 110 displays such information to a user. For example, the host 110 may display, via the user output device 177 (FIG. 4), the node address of each node through which the route trace message passed and/or the link quality value for each link traversed by the route trace message. In other embodiments, other techniques for using the information provided by the link trace message are possible.

In one exemplary embodiment, the route trace message is used to determine a value, referred to as a "roundtrip time (RTT) value," indicative of a roundtrip time for transmission of the route trace message through the designated path. In this regard, the source node may be configured to timestamp the route trace message at the time of transmission. Thus, when the route trace message is ultimately received by the source node, the source node can calculate the RTT value by subtracting the timestamp value (which is indicative of the time of transmission from the source node) from a value indicative of the time of reception by the source node.

If desired, any node of the network 20 may be used to calculate a RTT value for a portion of the network 20. For example, referring to FIG. 5, if the host 110 originates a route trace message or requests the node 21 to transmit a route trace message, the node 21 may be configured to calculate a RTT value indicative of the roundtrip time from the node 21 back to the node 21.

In this regard, the core logic 80 of the node 21 is configured to insert, into the route trace message, a timestamp indicative of the time of transmission of the route trace message from the node 21. Note that the timestamp may be based on an internal clock (not shown) of the node 21. Once the route trace message arrives at the node 21 after transmission through the network 20, the core logic 80 of the node 21 calculates a RTT value indicative of the time used to transmit the message through the network 20 back to the node 21. The core logic 80 of the node 21 then replaces the timestamp originally inserted into the route trace message by the node 21 with the calculated RTT value and transmits the route trace message to the host 110 thereby informing the host 110 of the message's roundtrip time relative to the node 21. If desired, the host 110 may display the RTT value to a user or otherwise use the RTT value.

In one exemplary embodiment, a unicast message, referred to hereafter as a "unicast ping," can be used to test connectivity from one node to another. In this regard, the unicast ping has a source address identifying the node that originally transmitted the ping and a destination address identifying the node that is to receive and respond to the ping. The unicast ping also has a message type indicator indicating the type of message being communicated.

Upon transmission of a unicast ping, such ping is routed through the network 20, like other unicast messages. Moreover, if the routing table of any hop node does not have an entry for the ping's destination address, then the hop node may perform a route discovery by broadcasting a route discovery message, as described above, or otherwise in order to discover where to route the ping. Upon receiving a unicast ping, the destination node replies with a unicast message, referred to hereafter as a "unicast ping reply." The unicast ping reply has a source address identifying the destination node for the unicast ping, and a destination address identifying the source node for the unicast ping. Therefore, the unicast ping reply is transmitted from the destination of the unicast ping to the source of such ping. The ping reply also has a message type indicator indicating that it is a reply to a unicast ping. Thus, upon receiving the unicast ping reply, the source node of the unicast ping is aware that the ping's destination received the ping thereby verifying connectivity with this node.

In one exemplary, each ping reply includes information about the node that originally transmits the reply. For example, the ping reply may include a list of the scripts that are stored in the replying node or other information about the node thereby enabling the node that originally transmitted the ping to learn various information from the replying node.

Another message, referred to as a "multicast ping," may be used to verify connectivity with other nodes or to discover other nodes. The multicast ping is a multicast message having a source address that identifies the node that originally transmitted the ping. The multicast ping also has a message type indicator indicating the message type. Each node that receives a multicast ping is configured to transmit a unicast ping reply to the node identified by the source address in the ping. Like for other multicast messages, the node that receives a multicast ping also rebroadcasts the ping and decrements the ping's time-to-live value unless the time-to-live value of the received ping is below a specified threshold. Thus, by transmitting a multicast ping, any node can determine which other nodes have connectivity to the transmitting node within the range indicted by the selected time-to-live value for the ping.

In one exemplary embodiment, the source node of a multicast ping inserts a value, referred to hereafter as a "ping identifier," into the multicast ping broadcast by such node. Further, each node that receives a multicast ping having a particular ping identifier responds only once. Thus, if a node receives a multicast ping having the same ping identifier relative to another multicast ping previously received by the node, then the node refrains from transmitting any reply to the later received ping. Therefore, the source node of a multicast ping can re-transmit the same multicast ping in order to discover nodes that were unable to hear the original multicast ping having the same ping identifier.

To better illustrate the foregoing, assume that the core logic 80 of the node 23 depicted in FIG. 5 broadcasts a multicast ping having ping identifier of "A." Further assume that the ping is received by nodes 21 and 22 but not node 24. The core logic 80 of each node 21 and 22 stores the ping identifier in an area of memory, referred to hereafter as a "ping identifier log." Such core logic 80 also compares the received ping identifier to other ping identifiers stored in its respective log. If the received ping identifier does not correspond to (e.g., match) any of the stored ping identifiers, the core logic 80 replies to the multicast ping. In the instant case, assume that the multicast ping transmitted by the node 23 is the first ping having the ping identifier A. In such an example, the ping identifier of the received multicast ping does not correspond to any of the ping identifiers previously stored in the respective ping identifier log, and the core logic 80 of each node 21 and 22, therefore, transmits a unicast ping reply to the node 23. Thus, the core logic 80 of the node 23 learns of the presence of the nodes 21 and 22 and/or verifies connectivity with such nodes 21 and 22. However, since the node 24 did not hear the multicast ping, the node 23 does not receive a unicast ping from the node 24.

Later, the core logic 80 of the node 23 may broadcast another multicast ping, referred to hereafter as the "current multicast ping," having the same ping identifier A. Assume that this multicast ping is received by each of the nodes 21, 22, and 24. Since the nodes 21 and 22 received the previous multicast ping, each of the ping identifier logs of the nodes 21 and 22 has a previously stored ping identifier corresponding to that of the current multicast ping. Thus, in response to a determination that the ping identifier of the current multicast ping corresponds to a ping identifier in its respective ping identifier log, each node 21 and 22 refrains from transmitting a unicast ping reply in response to the current multicast ping.

However, since the node 24 did not receive the previous multicast ping, the ping identifier log of the node 24 does not include a ping identifier corresponding to ping identifier A of the current multicast ping. Thus, in response to the current multicast ping, the core logic 80 of the node 24, after comparing the ping's identifier to its ping identifier log, transmits a unicast ping reply to the node 23. At this point, the core logic 80 of the node 23 discovers the presence of the node 24 and/or verifies connectivity with the node 24. Thus, by transmitting a multicast ping having the same identifier as a previous one, the node 23 is able to receive replies from nodes that did not reply to the previous multicast ping, yet the nodes that did reply to the previous multicast ping are precluded from replying to the subsequent multicast ping thereby helping to reduce traffic on the network 20. Accordingly, the core logic 80 of the node 23 can discover and/or verify connectivity with nodes unable to reply to the previous multicast ping without burdening the network 20 and the processing resources of the nodes with replies from nodes that already responded to the previous multicast ping.

There are various techniques that can be used to discover the topology of the network 20 at any given time. In one exemplary embodiment, a multicast message, referred to hereafter as a "multicast topology discovery message," is used to discover the topology of the network 20. The message has time-to-live value that is set to limit the range of the message. In one exemplary embodiment, the time-to-live value is set to a value of 1, but other time-to-live values are possible. A node, referred to hereafter as the "topology building node," causes at least one other node to broadcast a multicast topology discovery message. Each node that receives the topology discovery message replies by transmitting a unicast message, referred to as a "topology multicast reply," to the topology building node. The topology building node builds a topology of the network 20 based on the topology broadcast replies that are transmitted in response to the multicast topology discovery message. In this regard, the topology building node adds each new source node address from the topology broadcast replies. The topology building node also indicates in the topology the links that exist between the nodes so that the topology indicates which nodes can communicate with each other.

After updating the topology based on a topology multicast reply, the topology building node then transmits a unicast message to the node newly added to the topology instructing such node to broadcast a new multicast topology discovery message. The process is repeated for each new multicast topology discovery message such that, over time, the topology building node builds a complete topology of the network 20. Such topology may be displayed to a user if desired.

An exemplary method of building a topology will now be described below with particular reference to FIG. 12. It should be emphasized that the method is exemplary, and it would be apparent to one of ordinary skill that changes to the described method and/or other methods are possible.

Referring to FIG. 5, assume that a user of the host 110 desires to view a topology of the network 20 and, therefore, submits a user input requesting a display of the network topology. In response to such input, the host 110 creates and displays a topology of the network 20. In this regard, as described above, the host 110 is coupled to the node 21 and aware of the presence of the node 21. Thus, the core logic 152 (FIG. 4) of the host 110 stores topology data 505 for indicating the topology of the network 20 and adds the address of the node 21 to the topology data 505.

Further, the core logic 152 transmits a unicast message, referred to hereafter as "topology multicast command," to the node 21, as shown by block 512 of FIG. 11. The topology multicast command instructs the receiving node 21 to wirelessly transmit a multicast topology discovery message. The multicast topology discovery message has a time-to-live value of 1 so that it is not rebroadcast by any node that receives it. The multicast topology discovery message also includes the node address of the node (which in this case is host 110) that is building the topology. In response to the topology multicast command, the core logic 80 of the node 21 broadcasts a multicast topology discovery message. For illustrative purposes, assume that the multicast topology discovery message is received only by nodes 22 and 23.

Each node 22 and 23 that receives the multicast topology discovery message transmits a topology multicast reply to the topology building node (which is host 110 in the instant example) in response to the multicast topology discovery message. The topology multicast reply indicates the address of the node that is replying to the multicast topology discovery message, the node that transmitted the multicast topology discovery message, and the node (which is host 110 in the instant example) that is building the topology. Note that the address of the node that is replying and the address of the node that is building the topology may be indicated by the source address and the destination address of the topology multicast reply.

Therefore, in the instant example in which the nodes 22 and 23 hear the multicast topology discovery message transmitted by the node 21, each of the nodes 22 and 23 transmits a topology multicast reply to the host 110. Each such reply identifies the node 21 as the source of the multicast topology discovery message and the host 110 as the reply's destination. The reply transmitted by the node 22 identifies the node 22 as its source, and the reply transmitted by the node 23 identifies the node 23 as its source. Further, since the time-to-live value of each multicast topology discovery message is 1, the node 22 does not rebroadcast the multicast topology discovery message received by it, and the node 23 does not rebroadcast the multicast topology discovery message received by it.

Figure 12:
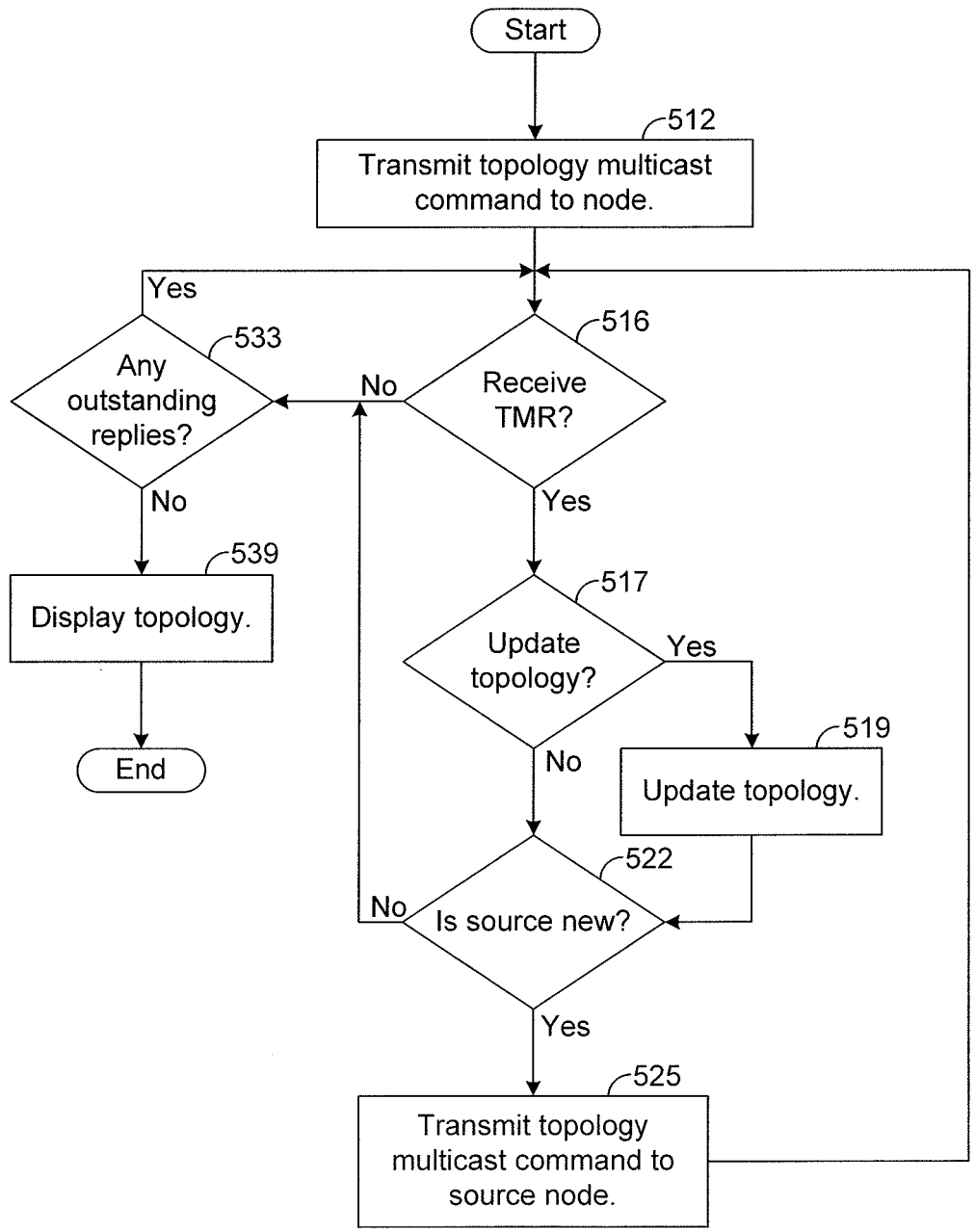
FIG. 12 is a flow chart illustrating an exemplary method for discovering a topology of a network.

As shown by block 516 of FIG. 12, the core logic 152 of the host 110 determines when it has received a topology multicast reply (TMR). When it receives such a reply, it determines whether to update the topology defined by the topology data 505, as shown by block 517 of FIG. 12, and the core logic 152 then, if appropriate, updates the topology data 505, as shown by block 519. In this regard, the core logic 152 adds the node address of the reply's source if such node address is not already included in the topology. Also, the core logic 152 adds to the topology any link indicated by the reply if such link is not already included in the topology.

For example, in response to the reply from the node 22, the core logic 152 may add the node address of the node 22 to the topology such that the topology indicates that node 22 is within the network 20. Further, since the reply indicates that the node 22 received a multicast topology discovery message from the node 21, the core logic 152 can update the topology to indicate a link between the nodes 21 and 22. Similarly, in response to the reply from the node 23, the core logic 152 may add the node address of the node 23 to the topology. Further, since the reply indicates that the node 23 received a multicast topology discovery message from the node 21, the core logic 152 may also update the topology to indicate a link between the nodes 21 and 23.

As shown by block 522, after receiving a topology multicast reply, the core logic 152 determines whether the source node for the reply is new to the topology such that its address was added in block 519. If so, the core logic 152 transmits a topology multicast command to such source node, as shown by block 525 of FIG. 12. The source node broadcasts a multicast topology discovery message.

Thus, the core logic 152 of the host 110 transmits a topology multicast command to the node 22 and transmits another topology multicast command to the node 23. In response, the node 22 broadcasts a multicast topology discovery message, and the node 23 broadcasts a multicast topology discovery message.

For illustrative purposes, assume that the nodes 21 and 23 receive the multicast topology discovery message transmitted by the node 22. In such case, the node 21 transmits a topology multicast reply to the host 110, and the node 23 transmits a topology multicast reply to the host 110.

In processing the reply from the node 21, the core logic 152 identifies the nodes 21 and 22 and determines that there is a link between such nodes 21 and 22. However, there is no need to update the topology data 505 since the presence of the node 21, the node 22, and the link between the nodes 21 and 22 is already known and indicated by the topology data 505. Alternatively, an update could be made indicating the presence of a bidirectional link rather than a unidirectional link if the direction of the links is tracked in the topology. Further, since the source of the reply (i.e., node 21) is already known, as indicated by the topology data 505 upon reception of the reply, the core logic 152 of the host 110 refrains from transmitting a topology multicast command to the node 21. That is, the core logic 152 makes a "no" determination in block 522.

In processing the reply from the node 23, the core logic 152 identifies the address of the node 22 and the address of the node 23 from the reply. The core logic 152 also determines that there is a link between the two nodes 22 and 23 based on the reply. However, the presence of both nodes 22 and 23 are already known, as indicated by the topology data 505. Thus, the core logic 152 does not update the topology data 505 to add the addresses of the nodes 22 and 23. However, the topology data does not yet indicate a link between the nodes 22 and 23. Therefore, the core logic 152 updates the topology data 505 to indicate that a link exists between the nodes 22 and 23. Further, since the source of the reply (i.e., node 23) is already known, as indicated by the topology data 505 upon reception of the reply, the core logic 152 of the host 110 refrains from transmitting a topology multicast command to the node 23 in response to the reply from the node 23.

Also assume that the node 21, the node 22, and the node 24 receive the multicast topology discovery message transmitted by the node 23. In such case, the node 21 transmits a topology multicast reply to the host 110, and the node 22 transmits a topology multicast reply to the host 110. In addition, the node 24 transmits a topology multicast reply to the host 110.

In processing the reply from the node 21, the core logic 152 identifies the nodes 21 and 23 and determines that there is a link between such nodes 21 and 23. However, there is no need to update the topology data 505 since the presence of the node 21, the node 23, and the link between the nodes 21 and 23 is already known and indicated by the topology data 505. Further, since the source of the reply (i.e., node 21) is already known, as indicated by the topology data 505 upon reception of the reply, the core logic 152 of the host 110 refrains from transmitting a topology multicast command to the node 21. That is, the core logic 152 makes a "no" determination in block 522.

For illustrative purposes, assume that the host 110 receives the topology multicast reply from the node 22 after receiving and processing the topology multicast reply from the node 23. In such case, the presence of the nodes 21-23 and of the links between the nodes 21-23 is already known, as indicated by the topology data 505, upon the host's reception of the topology multicast reply from the node 22. However, the presence of the node 24 and of the link between the nodes 23 and 24 is not yet known.

In processing the reply from the node 22, the core logic 152 identifies the address of the node 22 and the address of the node 23 from the reply. The core logic 152 also determines that there is a link between the two nodes 22 and 23 based on the reply. However, the presence of both nodes 22 and 23 and the link between the two nodes 22 and 23 is already known and indicated by the topology data 505, as described above. Thus, the core logic 152 does not update the topology data 505. Further, since the source of the reply (i.e., node 22) is already known, as indicated by the topology data 505 upon reception of the reply, the core logic 152 of the host 110 refrains from transmitting a topology multicast command to the node 22 in response to the reply from the node 22.

In processing the reply from the node 24, the core logic 152 identifies the address of the node 24 and the address of the node 23 from the reply. The core logic 152 also determines that there is a link between the two nodes 23 and 24. The presence of the node 23 is already known, as indicated by the topology data 505, but the presence of the node 24 and of the link between the nodes 23 and 24 is not yet known and indicated by the topology data 505. Thus, in block 519 of FIG. 12, the core logic 152 updates the topology data 505 to add the address of the node 24 and to indicate a link between the nodes 23 and 24. In addition, since the node 24 is new or, in other words, not indicated by the topology data 152 at the time of reception of the reply, then the core logic 152 makes a "yes" determination in block 522 and, therefore, transmits a topology multicast command to the node 24. Note that the topology indicated by the topology data 505 is now complete assuming that nodes 21-24 and 110 are the only nodes of the network 20.

In response to the topology multicast command transmitted to the node 24, the node 24 broadcasts a multicast topology discovery message. Such message is heard by the node 23, which transmits a topology multicast reply in response to the message. In processing such reply, the core logic 152 of the host 110 identifies the address of the node 23 and the address of the node 24 from the reply. The core logic 152 also determines that there is a link between the two nodes 23 and 24. However, the presence of both nodes 23 and 24, as well as the link between the two nodes 23 and 24, are already known, as indicated by the topology data 505. Thus, the core logic 152 does not update the topology data 505 and does not transmit any topology multicast command in response to the topology multicast reply received from the node 24.

After receiving the topology multicast reply from the node 24, the core logic 152 of the host 110 determines in block 533 that there are no outstanding topology broadcast replies. Such a determination can be made in a variety of ways. As an example, the core logic 152 may determine that there are no outstanding topology broadcast replies after a predetermined amount of time has elapsed after sending the last topology multicast command without receiving any topology multicast reply from a new node. In other embodiments, other techniques for determining when there are no more outstanding topology broadcast replies are possible.

Once the core logic 152 determines that there are no more outstanding topology broadcast replies, the core logic 152 displays a complete topology of the network 20 based on the topology data 505, as indicated by block 539 of FIG. 12.

In one exemplary embodiment, the core logic 152 of the host 110 is configured to automatically discover the topology of the network 20 by default. Thus, upon power up, the core logic 152 automatically broadcasts multicast topology discovery messages, as described above, in order to define the topology data 505. However, if desired, a user may change the default setting, referred to hereafter as the "automatic topology building setting," for controlling whether the core logic 152 automatically discovers the network topology.

In this regard, the core logic 152 displays a GUI that includes a user-selectable feature, such as a user-selectable box, button, or icon, that when selected by the user changes the automatic topology building setting such that the core logic 152, based on such setting, does not automatically discover the topology of the network 20. In this regard, the core logic 152 discovers the topology of the network 20 on demand or, in other words, in response to a user input requesting discovery the network topology. Any change in the automatic topology building setting is preferably saved such that the change is preserved unless and until the user changes such setting again. Thus, if the setting has been changed to require topology discoveries to be performed on demand, then upon each power up, the core logic 152 refrains from performing a topology discovery until such a discovery is requested via user input.

Requiring a user input to request a topology discovery before performing such a discovery may help to reduce needless traffic on the network 20. For example, assume that a user powers up the host 110 for the purpose of uploading a script image to one node of the network 20 or some other action that does not benefit greatly from the host 110 performing a topology discovery. If the core logic 152 automatically performs the topology discovery upon power up, then a significant amount of messaging may take place for the topology discovery even though there is not a great benefit in performing the discovery. Such messaging may increase the delay in getting the new script image uploaded thereby frustrating the user. However, if the core logic 152 is prevented from initiating a topology discovery until requested by a user, then the effects of the messaging may be avoided until the user desires to have a topology generated.

Several of the embodiments have been described herein in the context of wireless sensor networks. It should be emphasized that the communication and networking techniques described herein may be applied to other types of networks.

Now, therefore, the following is claimed:

1. A wireless mesh network, comprising:

a first node;

a second node operable to transmit to the first node a first topology multicast command having a source address identifying the second node, wherein the first node is operable to transmit a first multicast topology discovery message in response to the first topology multicast command, the first multicast topology discovery message identifying the second node; and a plurality of nodes, including at least a third node and a fourth node, within range of the first node and operable to receive the first multicast topology discovery message, each of the plurality of nodes operable to transmit, in response to the first multicast topology discovery message, a respective topology multicast reply having a destination address identifying the second node and having an address identifying the first node that transmitted the first multicast topology discovery message, wherein the second node is operable to build a topology of the wireless mesh network based on a plurality of the topology multicast replies transmitted to the second node by the plurality of nodes, wherein the second node in response to the topology multicast reply transmitted by the third node is operable to add the third node to the topology and transmit to the third node a second topology multicast command having a source address identifying the second node thereby causing the third node to transmit a second multicast topology discovery message identifying the second node, wherein a fifth node of the network is operable to receive the second multicast topology discovery message and to transmit a topology multicast reply having a destination address identifying the second node and an address identifying the third node, wherein the second node in response to the topology multicast reply transmitted by the fifth node is operable to add the fifth node to the topology, wherein each topology multicast command is a unicast message, wherein each multicast topology discovery message is a multicast message, and wherein each topology multicast reply is a unicast message.

2. The network of claim 1, wherein the first multicast topology discovery message has a time-to-live value for causing each of the plurality of nodes receiving the first multicast topology discovery message to refrain from retransmitting the first multicast topology discovery message.

3. The network of claim 1, wherein the second node for each topology multicast reply received from the plurality of nodes is operable to:
- determine whether the node identified by the source address of the topology multicast reply is identified by the topology;
- add the node identified by the source address of the topology multicast reply if it is not identified by the topology; and
- transmit a topology multicast command to the node identified by the source address of the topology multicast reply if it is not identified by the topology.

4. The network of claim 1, wherein the second node is operable to transmit a first multicast ping, wherein the first multicast ping is a multicast message, wherein each of the plurality of nodes is operable to receive the first multicast ping and to transmit to the second node a unicast ping reply to the second node in response to the first multicast ping, wherein the unicast ping reply is a unicast message having a destination address identifying the second node.

5. The network of claim 4, wherein the first multicast ping has a ping identifier, wherein the one of the plurality of nodes is operable to store a ping identifier log comprising ping identifiers from multicast pings received by the one of the plurality of nodes, wherein the one of the plurality of nodes is operable to add the ping identifier of the first multicast ping to the ping identifier log in response to the first multicast ping, wherein the second node is operable to transmit a second multicast ping having the ping identifier of the first multicast ping, and wherein the one of the plurality of nodes is operable to determine whether to transmit a unicast ping reply to the second node in response to the second multicast ping based on a comparison of the ping identifier of the second multicast ping and the ping identifier log.

6. The network of claim 1, further comprising logic operable to maintain an automatic topology building setting for controlling whether the second node automatically initiates a discovery of the topology upon power up of the logic, wherein the logic is operable to control the automatic building setting based on user input.

7. The network of claim 1, wherein the first node is operable to control the first multicast topology discovery message transmitted by the first node such that the fifth node does not receive the first multicast topology discovery message.

8. The network of claim 1, wherein the second node is operable to update the topology to indicate a link between the third node and the first node in response to the topology multicast reply transmitted by the third node and based on the address identifying the first node in the topology multicast reply transmitted by the third node.

9. The network of claim 8, wherein the one of the third node is operable to define the topology multicast reply transmitted by the third node to indicate that the third node received the first multicast topology discovery message from the first node.

10. A method for use in a wireless mesh network, comprising:
- transmitting a first topology multicast command to a first node of the network from a second node of the network, the first topology multicast command having a source address identifying the second node;
- transmitting a first multicast topology discovery message from the first node in response to the first topology multicast command, the first multicast topology discovery message identifying the second node;
- receiving the first multicast topology discovery message at a plurality of nodes of the network within range of the first node, the plurality of nodes including at least a third node and a fourth node;
- transmitting, in response to the first multicast topology discovery message, a respective topology multicast reply from each of the plurality of nodes to the second node, each of the topology multicast replies transmitted from the plurality of nodes having a destination address identifying the second node and an address identifying the first node that transmitted the first multicast topology discovery message;
- building a topology of the wireless mesh network based on a plurality of the topology multicast replies transmitted from the plurality of nodes, wherein the building comprises adding the third node to the topology in response to the topology multicast reply transmitted from the third node;
- transmitting a second topology multicast command to the third node in response to the topology multicast reply transmitted from the third node;
- transmitting a second multicast topology discovery message from the third node in response to the second topology multicast command, the second multicast topology discovery message identifying the second node;
- receiving the second multicast topology discovery message at a fifth node of the network within range of the third node;
- transmitting, in response to the second multicast topology discovery message, a topology multicast reply from the fifth node, the topology multicast reply transmitted from the fifth node having a destination address identifying the second node and an address identifying the third node; and
- adding the fifth node to the topology in response to the topology multicast reply transmitted from the fifth node,
- wherein each topology multicast command is a unicast message, wherein each multicast topology discovery message is a multicast message, and wherein each topology multicast reply is a unicast message.

11. The method of claim 10, wherein the first multicast topology discovery message has a time-to-live value, and wherein the method further comprises causing each of the plurality of nodes to refrain from retransmitting the first multicast topology discovery message based on the time-to-live value.

12. The network of claim 10, wherein the building comprises, for each transmitted topology multicast reply:
- determining whether a source node of the topology multicast reply is identified by the topology;
- adding the source node to the topology if the source node is not identified by the topology; and
- transmitting a topology multicast command to the source node if the source node is not identified by the topology.

13. The method of claim 10, further comprising indicating in the topology a link between the third node and the first node in response to the topology multicast reply transmitted from the third node and based on the address identifying the first node in the topology multicast reply transmitted from the third node.

14. The method of claim 13, further comprising defining the topology multicast reply transmitted from the third node to indicate that the third node received the first multicast topology discovery message from the first node.

\* \* \* \* \*